United States Patent

(12) United States Patent
Zappitello et al.

(10) Patent No.: US 10,286,646 B2
(45) Date of Patent: May 14, 2019

(54) RAFT TECHNIQUE IN THREE-DIMENSIONAL PRINTING

(71) Applicant: MakerBot Industries, LLC, Brooklyn, NY (US)

(72) Inventors: Michael Vincent Zappitello, Brooklyn, NY (US); Kevin C. Rand, New York, NY (US); Andrey V. Patrov, Brooklyn, NY (US); Justy E. Alicea, New York, NY (US); Gregory M. Studer, Brooklyn, NY (US)

(73) Assignee: MakerBot Industries, LLC, Brooklyn, NY (US)

( * ) Notice: Subject to any disclaimer, the term of this patent is extended or adjusted under 35 U.S.C. 154(b) by 315 days.

(21) Appl. No.: 15/388,384

(22) Filed: Dec. 22, 2016

(65) Prior Publication Data

US 2017/0173867 A1 Jun. 22, 2017

Related U.S. Application Data

(60) Provisional application No. 62/270,899, filed on Dec. 22, 2015.

(51) Int. Cl.
*B29C 67/00* (2017.01)
*B33Y 50/02* (2015.01)
(Continued)

(52) U.S. Cl.
CPC ............ *B33Y 50/02* (2014.12); *B29C 64/106* (2017.08); *B29C 64/386* (2017.08); *B29C 64/40* (2017.08);
(Continued)

(58) Field of Classification Search
CPC ...... B29C 64/40; B29C 64/106; B29C 64/112
See application file for complete search history.

(56) References Cited

U.S. PATENT DOCUMENTS

2014/0371895 A1* 12/2014 Sadusk ................. B33Y 10/00 700/98
2015/0145169 A1* 5/2015 Liu ....................... B33Y 10/00 264/308
(Continued)

OTHER PUBLICATIONS

XueMing (https://zavax.wordpress.conn/2013/04/24/how-to-3d-print-peel-able-supportive-raft-base-platform-with-slic3r/, Apr. 24, 2013).*

*Primary Examiner* — Jason L Lazorcik
(74) *Attorney, Agent, or Firm* — Strategic Patents, P.C.

(57) ABSTRACT

A raft to support a three-dimensional object on a build platform of a three-dimensional printer can be fabricated with a controlled adhesion pattern to improve overall raft performance. For improved raft-to-build platform adhesion, an exterior portion around the perimeter of the raft may be fabricated with greater adhesion (per unit of surface area covered by the exterior portion) than an interior portion. This can be accomplished by varying the volume of build material, varying the printing height, or using different patterns of build material. At the same time, adhesion of the raft to a printed object built thereon can be controlled with a number of techniques such as using specific build patterns for the top layer of the raft or varying printing heights (e.g., z-axis position) between the top of the raft and the bottom of the object.

20 Claims, 12 Drawing Sheets

(51) Int. Cl.
*B33Y 10/00* (2015.01)
*B29C 64/106* (2017.01)
*B29C 64/386* (2017.01)
*B29C 64/40* (2017.01)
*B29K 105/00* (2006.01)

(52) U.S. Cl.
CPC ...... *B33Y 10/00* (2014.12); *B29K 2105/0067* (2013.01)

(56) References Cited

U.S. PATENT DOCUMENTS

| | | | |
|---|---|---|---|
| 2015/0145171 A1* | 5/2015 | Walker | B33Y 10/00 264/401 |
| 2016/0039152 A1* | 2/2016 | Hara | B29C 67/0092 264/308 |
| 2017/0209929 A1* | 7/2017 | Ishida | B29C 64/165 |
| 2018/0056607 A1* | 3/2018 | Socha-Leialoha | B33Y 10/00 |
| 2018/0250871 A1* | 9/2018 | Mugishima | B29C 64/112 |
| 2018/0354196 A1* | 12/2018 | Wu | B29C 64/245 |

\* cited by examiner

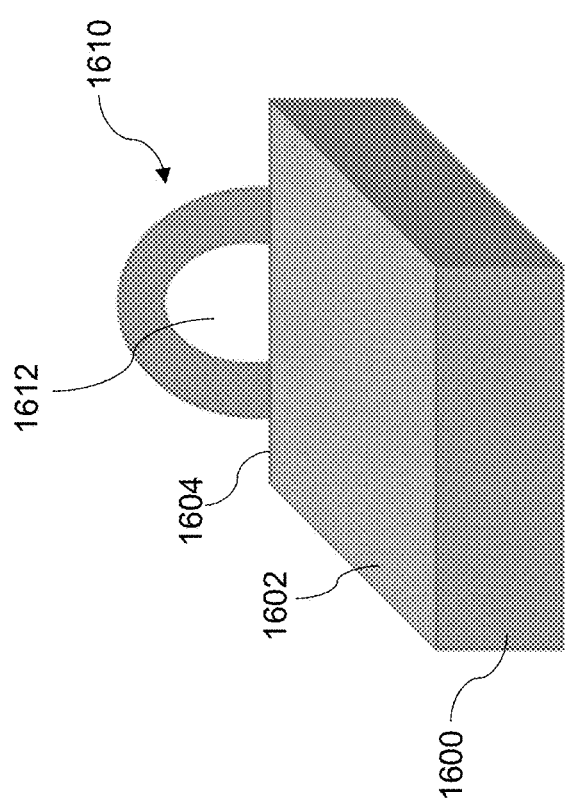

RAFT TECHNIQUE IN THREE-DIMENSIONAL PRINTING

CROSS-REFERENCE TO RELATED APPLICATIONS

This application claims the benefit under 35 U.S.C. § 119(e) of U.S. Provisional Application No. 62/270,899 filed on Dec. 22, 2015, the entire contents of which are hereby incorporated by reference.

TECHNICAL FIELD

The disclosure relates to raft techniques in three-dimensional printing, and more specifically to the improvement of adhesion characteristics between the raft/build platform and the raft/printed object.

BACKGROUND

Rafts may be used in a three-dimensional printing process for automatic leveling and to prevent warping of an object being printed. A raft is a platform for an object that is fabricated on another surface prior to fabrication of the object itself to provide a consistent surface on which to initiate fabrication of the object. A typical raft is printed from the same build material as the object using a standard grid of spaced apart segments of build material. This provides a level surface of material that can bond to the object while reducing the surface area of contact between the raft and the object. While this works adequately, there is often a strong bond formed between the raft/build platform and the raft/printed object, which can necessitate additional finishing steps for removal.

SUMMARY

Rafts and associated techniques described herein can provide improved adhesion characteristics in three-dimensional printing. A raft to support a three-dimensional object on a build platform of a three-dimensional printer can be fabricated with a controlled adhesion pattern to improve overall raft performance. For improved raft-to-build platform adhesion, an exterior portion around the perimeter of the raft may be fabricated with greater adhesion (per unit of surface area covered by the exterior portion) than an interior portion. This can be accomplished by varying the volume of build material, varying the printing height, or using different patterns of build material. At the same time, adhesion of the raft to a printed object built thereon can be controlled with a number of techniques such as using specific build patterns for the top layer of the raft or varying printing heights (e.g., z-axis position) between the top of the raft and the bottom of the object.

BRIEF DESCRIPTION OF THE DRAWINGS

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

FIG. 16 is an isometric view of a raft including a projection forming a tab.

DETAILED DESCRIPTION

Figure 1:
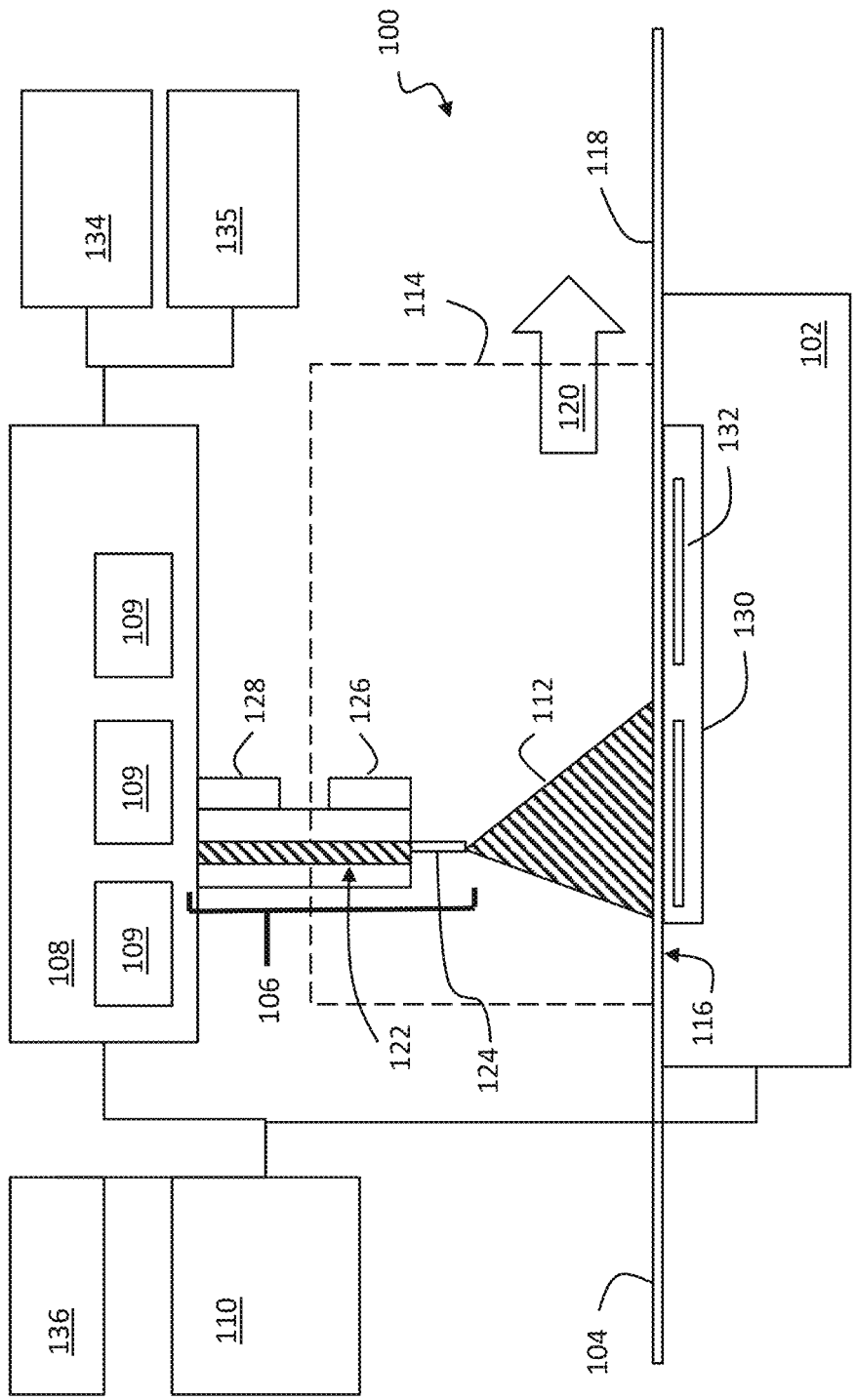
FIG. 1 is a block diagram of a three-dimensional printer.

The embodiments will now be described more fully hereinafter with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the disclosed embodiments.

In the following description, it is understood that terms such as "first," "second," "top," "bottom," "above,"

"below," "up," "down," and the like, are words of convenience and are not to be construed as limiting terms unless specifically stated.

The following description emphasizes three-dimensional printers using fused deposition modeling or similar techniques where a bead of material is extruded in a layered series of two dimensional patterns as "roads," "paths," or the like to form a three-dimensional object from a digital model. It will be understood, however, that numerous additive fabrication techniques are known in the art including without limitation multijet printing, stereolithography, Digital Light Processor ("DLP") three-dimensional printing, selective laser sintering, and so forth. Such techniques may benefit from the systems and methods described below, and all such printing technologies are intended to fall within the scope of this disclosure, and within the scope of terms such as "printer," "three-dimensional printer," "fabrication system," and so forth, unless a more specific meaning is explicitly provided or otherwise clear from the context.

FIG. 1 is a block diagram of a three-dimensional printer. In general, the printer 100 may include a build platform 102, a conveyor 104, an extruder 106, an x-y-z positioning assembly 108, and a controller 110 that cooperate to fabricate an object 112 within a working volume 114 of the printer 100.

The build platform 102 may include a surface 116 that is rigid and substantially planar. The surface 116 may support the conveyer 104 to provide a fixed, dimensionally and positionally stable platform on which to build the object 112.

The build platform 102 may include a thermal element 130 that controls the temperature of the build platform 102 through one or more active devices 132 such as resistive elements that convert electrical current into heat, Peltier effect devices that can create a heating or cooling affect, or any other thermoelectric heating and/or cooling devices. Thus, the thermal element 130 may be a heater that provides active heating to the build platform 102, a cooling element that provides active cooling to the build platform 102, or a combination of these. The heater 130 may be coupled in a communicating relationship with the controller 110 for the controller 110 to controllably impart heat to or remove heat from the surface 116 of the build platform 102. Thus, the thermal element 130 may include an active cooling element positioned within or adjacent to the build platform 102 to controllably cool the build platform 102.

It will be understood that a variety of other techniques may be employed to control a temperature of the build platform 102. For example, the build platform 102 may use a gas cooling or gas heating device such as a vacuum chamber or the like in an interior thereof, which may be quickly pressurized to heat the build platform 102 or vacated to cool the build platform 102 as desired. As another example, a stream of heated or cooled gas may be applied directly to the build platform 102 before, during, and/or after a build process. Any device or combination of devices suitable for controlling a temperature of the build platform 102 may be adapted to use as the thermal element 130 described herein.

The conveyer 104 may be formed of a sheet 118 of material that moves in a path 120 through the working volume 114. Within the working volume 114, the path 120 may pass proximal to the surface 116 of the build platform 102—that is, resting directly on or otherwise supported by the surface 116—to provide a rigid, positionally stable working surface for a build. It will be understood that while the path 120 is depicted as a unidirectional arrow, the path 120 may be bidirectional, such that the conveyer 104 can move, for example, in either of two opposing directions through the working volume 114. It will also be understood that the path 120 may curve in any of a variety of ways, such as by looping underneath and around the build platform 102, over and/or under rollers, or around delivery and take up spools for the sheet 118 of material. Thus, while the path 120 may be generally (but not necessarily) uniform through the working volume 114, the conveyer 104 may move in any direction suitable for moving completed items from the working volume 114. The conveyor may include a motor or other similar drive mechanism (not shown) coupled to the controller 110 to control movement of the sheet 118 of material along the path 120. Various drive mechanisms are described in further detail below.

In general, the sheet 118 may be formed of a flexible material such as a mesh material, a polyamide, a polyethylene terephthalate (commercially available in bi-axial form as MYLAR), a polyimide film (commercially available as KAPTON), or any other suitably strong polymer or other material. The sheet 118 may have a thickness of about three to about seven thousandths of an inch, or any other thickness that permits the sheet 118 to follow the path 120 of the conveyer 104. For example, with sufficiently strong material, the sheet 118 may have a thickness of about one to about three thousandths of an inch. The sheet 118 may instead be formed of sections of rigid material joined by flexible links.

A working surface of the sheet 118 (e.g., an area on the top surface of the sheet 118 within the working volume 114) may be treated in a variety of manners to assist with adhesion of build material to the surface 118 and/or removal of completed objects from the surface 118. For example, the working surface may be abraded or otherwise textured (e.g., with grooves, protrusions, and the like) to improve adhesion between the working surface and the build material.

A variety of chemical treatments may be used on the working surface of the sheet 118 of material to further facilitate build processes as described herein. For example, the chemical treatment may include a deposition of material that can be chemically removed from the conveyer 104 by use of water, solvents, or the like. This may facilitate separation of a completed object from the conveyer by dissolving the layer of chemical treatment between the object 112 and the conveyor 104. The chemical treatments may include deposition of a material that easily separates from the conveyer such as a wax, mild adhesive, or the like. The chemical treatment may include a detachable surface such as an adhesive that is sprayed on to the conveyer 104 prior to fabrication of the object 112.

In one aspect, the conveyer 104 may be formed of a sheet of disposable, one-use material that is fed from a dispenser and consumed with each successive build.

In one aspect, the conveyer 104 may include a number of different working areas with different surface treatments adapted for different build materials or processes. For example, different areas may have different textures (smooth, abraded, grooved, etc.). Different areas may be formed of different materials. Different areas may also have or receive different chemical treatments. Thus, a single conveyer 104 may be used in a variety of different build processes by selecting the various working areas as needed or desired.

The extruder 106 may include a chamber 122 in an interior thereof to receive a build material. The build material may, for example, include acrylonitrile butadiene styrene ("ABS"), high-density polyethylene ("HDPL"), polylactic acid, or any other suitable plastic, thermoplastic, or other material that can usefully be extruded to form a three-dimensional object. The extruder 106 may include an extrusion tip 124 or other opening that includes an exit port with a circular, oval, slotted or other cross-sectional profile that extrudes build material in a desired cross-sectional shape.

The extruder 106 may include a heater 126 to melt thermoplastic or other meltable build materials within the chamber 122 for extrusion through an extrusion tip 124 in liquid form. While illustrated in block form, it will be understood that the heater 126 may include, e.g., coils of resistive wire wrapped about the extruder 106, one or more heating blocks with resistive elements to heat the extruder 106 with applied current, an inductive heater, or any other arrangement of heaters suitable for creating heat within the chamber 122 to melt the build material for extrusion. The extruder 106 may also or instead include a motor 128 or the like to push the build material into the chamber 122 and/or through the extrusion tip 124.

In general operation (and by way of example rather than limitation), a build material such as ABS plastic in filament form may be fed into the chamber 122 from a spool or the like by the motor 128, melted by the heater 126, and extruded from the extrusion tip 124. By controlling a rate of the motor 128, the temperature of the heater 126, and/or other process parameters, the build material may be extruded at a controlled volumetric rate. It will be understood that a variety of techniques may also or instead be employed to deliver build material at a controlled volumetric rate, which may depend upon the type of build material, the volumetric rate desired, and any other factors. All such techniques that might be suitably adapted to delivery of build material for fabrication of a three-dimensional object are intended to fall within the scope of this disclosure. Other techniques may be employed for three-dimensional printing, including extrusion-based techniques using a build material that is curable and/or a build material of sufficient viscosity to retain shape after extrusion.

The x-y-z positioning assembly 108 may generally be adapted to three-dimensionally position the extruder 106 and the extrusion tip 124 within the working volume 114. Thus, by controlling the volumetric rate of delivery for the build material and the x, y, z position of the extrusion tip 124, the object 112 may be fabricated in three dimensions by depositing successive layers of material in two-dimensional patterns derived, for example, from cross-sections of a computer model or other computerized representation of the object 112. A variety of arrangements and techniques are known in the art to achieve controlled linear movement along one or more axes. The x-y-z positioning assembly 108 may, for example, include a number of stepper motors 109 to control independently a position of the extruder within the working volume along each of an x-axis, a y-axis, and a z-axis. More generally, the x-y-z positioning assembly 108 may include, without limitation, various combinations of stepper motors, encoded DC motors, gears, belts, pulleys, worm gears, threads, and the like. Any such arrangement suitable for controllably positioning the extruder 106 within the working volume 114 may be adapted to use with the printer 100 described herein.

By way of example and not limitation, the conveyer 104 may be affixed to a bed that provides x-y positioning within the plane of the conveyer 104, while the extruder 106 can be independently moved along a z-axis. As another example, the extruder 106 may be stationary while the conveyer 104 is x, y, and z positionable. As another example, the extruder 106 may be x, y, and z positionable while the conveyer 104 remains fixed (relative to the working volume 114). In yet another example, the conveyer 104 may, by movement of the sheet 118 of material, control movement in one axis (e.g., the y-axis), while the extruder 106 moves in the z-axis as well as one axis in the plane of the sheet 118. Thus, in one aspect, the conveyor 104 may be attached to and move with at least one of an x-axis stage (that controls movement along the x-axis), a y-axis stage (that controls movement along a y-axis), and a z-axis stage (that controls movement along a z-axis) of the x-y-z positioning assembly 108. More generally, any arrangement of motors and other hardware controllable by the controller 110 may serve as the x-y-z positioning assembly 108 in the printer 100 described herein. Still more generally, while an x, y, z coordinate system serves as a convenient basis for positioning within three dimensions, any other coordinate system or combination of coordinate systems may also or instead be employed, such as a positional controller and assembly that operates according to cylindrical or spherical coordinates.

The controller 110 may be electrically coupled in a communicating relationship with the build platform 102, the conveyer 104, the x-y-z positioning assembly 108, and the other various components of the printer 100. In general, the controller 110 is operable to control the components of the printer 100, such as the build platform 102, the conveyer 104, the x-y-z positioning assembly 108, and any other components of the printer 100 described herein to fabricate the object 112 from the build material. The controller 110 may include any combination of software and/or processing circuitry suitable for controlling the various components of the printer 100 described herein including, without limitation, microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and the like. In one aspect, the controller 110 may include a microprocessor or other processing circuitry with sufficient computational power to provide related functions such as executing an operating system, providing a graphical user interface (e.g., to a display coupled to the controller 110 or printer 100), convert three-dimensional models into tool instructions, and operate a web server or otherwise host remote users and/or activity through the network interface 136 described below.

A variety of additional sensors may be usefully incorporated into the printer 100 described above. These are generically depicted as sensor 134 in FIG. 1, for which the positioning and mechanical/electrical interconnections with other elements of the printer 100 will depend upon the type and purpose of the sensor 134 and will be readily understood and appreciated by one of ordinary skill in the art. The sensor 134 may include a temperature sensor positioned to sense a temperature of the surface of the build platform 102. This may, for example, include a thermistor or the like embedded within or attached below the surface of the build platform 102. This may also or instead include an infrared detector or the like directed at the surface 116 of the build platform 102 or the sheet 118 of material of the conveyer 104. Other sensors that may be usefully incorporated into the printer 100 as the sensor 134 include a heat sensor, a volume flow rate sensor, a weight sensor, a sound sensor, and a light sensor. Certain more specific examples are provided below by way of example and not of limitation.

The sensor 134 may include a sensor to detect a presence (or absence) of the object 112 at a predetermined location on the conveyer 104. This may include an optical detector arranged in a beam-breaking configuration to sense the presence of the object 112 at a location such as an end of the conveyer 104. This may also or instead include an imaging device and image processing circuitry to capture an image of the working volume 114 and analyze the image to evaluate a position of the object 112. This sensor 134 may be used for example to ensure that the object 112 is removed from the conveyor 104 prior to beginning a new build at that location on the working surface such as the surface 116 of the build platform 102. Thus, the sensor 134 may be used to determine whether an object is present that should not be, or to detect when an object is absent. The feedback from this sensor 134 may be used by the controller 110 to issue processing interrupts or otherwise control operation of the printer 100.

The sensor 134 may include a sensor that detects a position of the conveyer 104 along the path. This information may be obtained from an encoder in a motor that drives the conveyer 104, or using any other suitable technique such as a visual sensor and corresponding fiducials (e.g., visible patterns, holes, or areas with opaque, specular, transparent, or otherwise detectable marking) on the sheet 118.

The sensor 134 may include a heater (instead of or in addition to the thermal element 130) to heat the working volume 114 such as a radiant heater or forced hot air to maintain the object 112 at a fixed, elevated temperature throughout a build. The sensor 134 may also or instead include a cooling element to maintain the object 112 at a predetermined sub-ambient temperature throughout a build.

The sensor 134 may also or instead include at least one video camera. The video camera may generally capture images of the working volume 114, the object 112, or any other hardware associated with the printer 100. The video camera may provide a remote video feed through the network interface 136, which feed may be available to remote users through a user interface maintained by, e.g., remote hardware, or within a web page provided by a web server hosted by the three-dimensional printer 100. Thus, in one aspect there is a user interface adapted to present a video feed from at least one video camera of a three-dimensional printer to a remote user through a user interface.

The sensor 134 may also or instead include more complex sensing and processing systems or subsystems, such as a three-dimensional scanner using optical techniques (e.g., stereoscopic imaging, or shape from motion imaging), structured light techniques, or any other suitable sensing and processing hardware that might extract three-dimensional information from the working volume 114. In another aspect, the sensor 134 may include a machine vision system that captures images and analyzes image content to obtain information about the status of a job, working volume 114, or an object 112 therein. The machine vision system may support a variety of imaging-based automatic inspection, process control, and/or robotic guidance functions for the three-dimensional printer 100 including without limitation pass/fail decisions, error detection (and corresponding audible or visual alerts), shape detection, position detection, orientation detection, collision avoidance, and the like.

Other components, generically depicted as other hardware 135, may also be included, such as input devices including a keyboard, touchpad, mouse, switches, dials, buttons, motion sensors, and the like, as well as output devices such as a display, a speaker or other audio transducer, light emitting diodes, and the like. Other hardware 135 may also or instead include a variety of cable connections and/or hardware adapters for connecting to, e.g., external computers, external hardware, external instrumentation or data acquisition systems, and the like.

The printer 100 may include, or be connected in a communicating relationship with, a network interface 136. The network interface 136 may include any combination of hardware and software suitable for coupling the controller 110 and other components of the printer 100 to a remote computer in a communicating relationship through a data network. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple into a local area network or the like that is in turn coupled to a data network such as the Internet. This may also or instead include hardware/software for a WiMAX connection or a cellular network connection (using, e.g., CDMA, GSM, LTE, or any other suitable protocol or combination of protocols). Consistently, the controller 110 may be configured to control participation by the printer 100 in any network to which the network interface 136 is connected, such as by autonomously connecting to the network to retrieve printable content, or responding to a remote request for status or availability.

Devices, systems, and methods for improved raft techniques in three-dimensional printing will now be described. These improved raft techniques may be used, e.g., with any of the printers described above. Implementations may be especially useful for three-dimensional printing systems using high-adhesion build platform materials and the like.

In general, rafts may be used in a three-dimensional printing process for automatic leveling, to prevent warping of an object being printed, or the like. A typical raft may be printed as a regular grid of crisscrossing, spaced apart roads, segments, or lengths of material (e.g., build material). This may allow the raft to be easily removable from a build platform of a three-dimensional printer and easily separated from a printed, three-dimensional object. However, these rafts may still create a substantial adhesion surface that bonds to the build platform and/or the printed object in certain locations, and complete removal of the raft from the build platform or printed object may be challenging. Sparse rafts typically allow for the printed object to droop between the deposited segments of filament in the raft, resulting in an unsatisfactory bottom surface.

The techniques described herein may provide a raft that can be easily and preferentially delaminated from the build platform of a three-dimensional printer and a three-dimensionally printed object after fabrication. To this end, techniques may be implemented to improve the adhesion characteristics between the raft and build platform and/or improve the adhesion characteristics between the raft and printed object. In an aspect, the first layer of the raft includes an exterior portion that has a greater adhesion to the build platform than that of the raft's interior portion for improved raft-to-build platform adhesion (e.g., a middle region of the raft is less adhesive than a region adjacent to the perimeter of the raft). The increased adhesion of the raft's exterior portion relative to its interior portion can be accomplished by, for example, varying the volume of build material (e.g., having less build material in the interior portion relative to the exterior portion), varying the printing height (e.g., having an increased printing height in the interior portion relative to the exterior portion), using different build patterns (e.g., using tighter build patterns in the exterior portion relative to the interior portion), and/or varying the size of the exterior portion. Improved raft-to-printed object adhesion may be accomplished by, for example, using specific build patterns for the top layer of the raft, printing portions of the shell of the object on its bottom layer at lower printing heights, depositing a thicker bottom layer of the printed object, and/or by computing specific printing heights for portions of the first layer of the object based on the shape of its base and varying the printing height accordingly.

Figure 2:
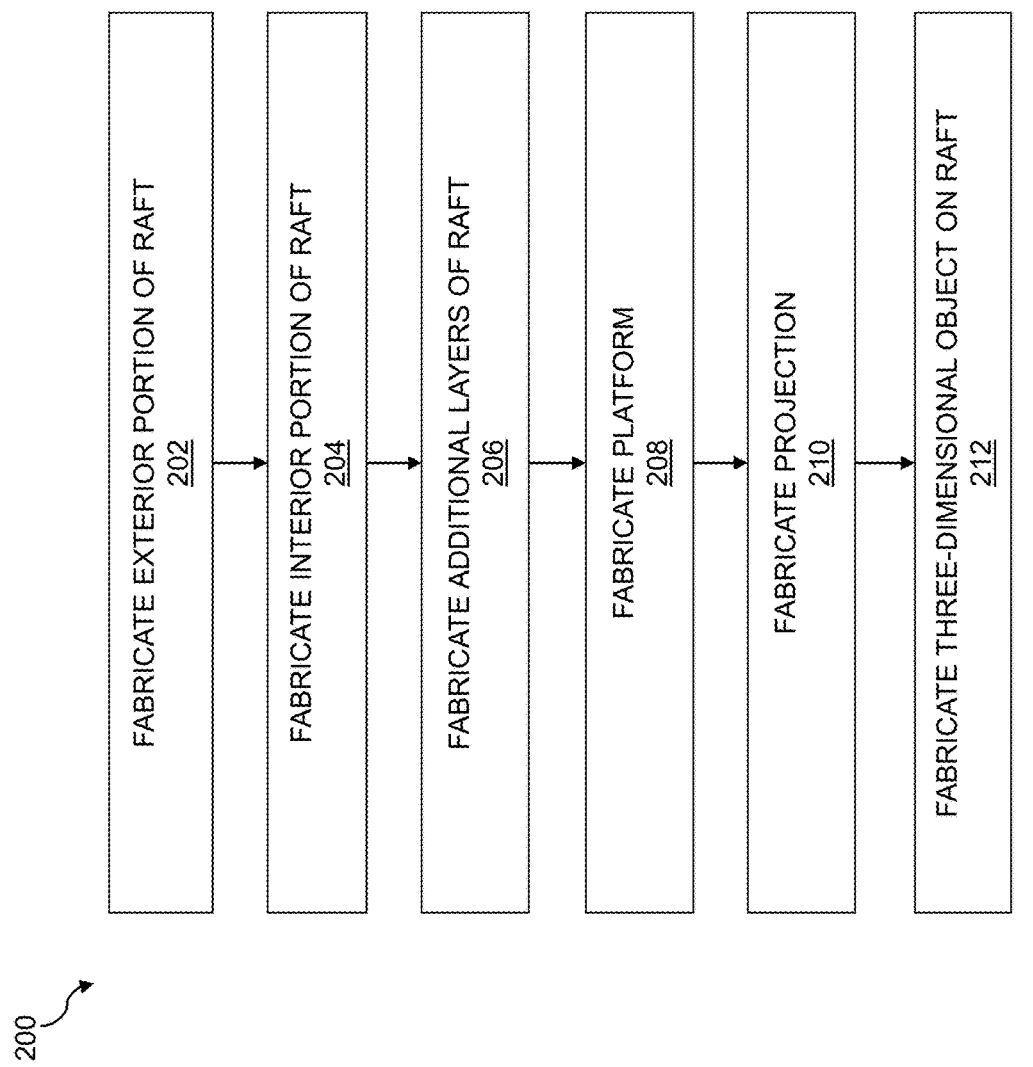
FIG. 2 is a flow chart of a method for fabricating a raft.

FIG. 2 is a flow chart of a method for fabricating an object with a raft. Specifically, the method 200 may include fabricating a raft on a build platform of a three-dimensional printer, and fabricating a three-dimensional object on the raft. In general, the method 200 may be used to control spatially adhesion characteristics between the raft and the build platform across a mating surface between the two. In general, this spatial control may be used to bond more securely the perimeter of the raft—e.g., an exterior portion—relative to an interior portion to resist warping, curling, or other phenomena while facilitating relatively easy removal of the printed object from the build platform.

The raft may include an exterior portion and an interior portion, for example, with the interior portion contained within the exterior portion. The exterior portion of the raft may be disposed at or near an exterior border of the raft, e.g., at or near the physical limits of the raft's physical dimensions in the horizontal or x-y plane. This may typically (but not necessarily) lie outside a projection of the first layer of the printed object into the x-y plane of the raft. That is, the raft may include an interior portion that lies directly beneath the immediately adjacent layer of the printed object, and the exterior portion may border this interior portion while providing a margin suitable to achieve stability and adhesion for retaining the raft on the build platform and receiving the printed object. The exterior portion may have a predetermined width following the shape of the raft along a perimeter of the raft. For example, the exterior portion may provide a margin around a corresponding shape of the interior of the raft. In an additional or alternative aspect, the exterior portion may form a regular geometry such as a square or circle around the x-y dimensions of the interior portion, while the interior portion follows a projection of the first layer of the printed object immediately vertically adjacent to the raft. The interior portion may be an area wholly enclosed by the exterior portion. The exterior portion and the interior portion, as described herein, may be located on only the first layer of the raft, in subsequent layers deposited above the first layer of the raft, or some combination of these.

As shown in step 202, the method 200 may include fabricating the exterior portion of a first layer of the raft. The exterior portion of the first layer of the raft may have a first adhesion force with the build platform. In general, this first adhesion force may be measured per unit of area of the exterior portion on the build platform. In this context, it should be understood that "measured" does not refer to an actual measurement that is made, but instead refers to the units used to express the corresponding adhesion force. It should also be understood that in this context, when one portion of a surface is said to be "on" another surface, e.g., for the "exterior portion on the build platform," this is intended to refer to the entire, projected surface area bounding that portion of the surface and not individual, discrete segments of that surface. Thus, where an exterior portion includes a number of discrete segments, as is typical of a fused deposition modeling process or the like, the intent is not to refer to the surface area physically in contact with the build platform, which may be a number of narrow strips, but to refer to the surface area enclosed by the entire exterior portion.

Furthermore, the overall intent may be to provide more secure bonding of exterior regions to the build platform than bonding of interior regions to the build platform. There are described herein several ways to achieve this objective. In one aspect, the exterior region may be more securely bonded to the build platform by increasing the overall surface area of the exterior region relative to the overall surface area of the interior region, which creates a greater aggregate adhesion force. In another aspect, certain print parameters may be controlled so that the adhesion force per unit of area is greater in exterior regions than in interior regions. While both techniques are within the scope of this disclosure, each can be expressed by referring distinctly to either the adhesion force generally, or to the adhesion force per unit of area specifically.

In an aspect, the exterior portion of a first layer of the raft may be fabricated using a first set of fabrication parameters. The first set of fabrication parameters may be, for example, selected to provide the first adhesion force between the exterior portion of the raft and the build platform. It will be understood that numerous print parameters may be used to control locally the adhesion force. For example, a deposition rate may be increased to deposit more material per unit length, thereby increasing adhesion relative to less material per unit length. Similarly, the in-plane or horizontal speed may be decreased, effectively achieving the same result of more material per unit length and greater adhesion. In an additional, or alternative, aspect, the temperature of the extrudate or the extrusion tool may be adjusted. Whether an increase or decrease in temperature will yield greater adhesion may generally depend on the material being deposited, the surface receiving the material, and so forth, any of which may be accurately characterized and applied by one of ordinary skill in the art. In a further or alternative aspect, the z-axis position or distance from a preceding layer (or the build platform) may be adjusted, to create, for example, greater vertical force on the extrudate to bond the extrudate more tightly to the preceding layer or to bond the extrudate within the preceding layer. More generally, any process parameter or combination of parameters that might be suitably employed to control adhesion forces for a deposited build material may be used to control the adhesion force as contemplated herein.

As shown in step 204, the method 200 may include fabricating the interior portion of the first layer of the raft. The interior portion of the first layer of the raft may have a second adhesion force with the build platform, where the second adhesion force is measured per unit area of the interior portion on the build platform. The second adhesion force may be, for example, less than the first adhesion force such that the build platform is more easily separable from interior portion than from the exterior portion, as described in greater detail below.

The interior portion of the first layer of the raft may be fabricated using a second set of fabrication parameters. The second set of fabrication parameters may be different from the first set of fabrication parameters described above. For example, at least one parameter in the second set of fabrication parameters may be different from a corresponding parameter in the first set of fabrication parameters, or a combination of parameters may be different, or all of the parameters may be different. Thus, for example, where the exterior portion is deposited with a volumetric deposition rate, r1, e.g., by controlling the rotational rate of a drive gear or other mechanical assembly that drives extrusion, the interior portion may be deposited with a second volumetric deposition rate, r2, where r1>r2.

The interior portion of the first layer of the raft may be fabricated to create a second adhesion force per unit of area between the interior portion of the raft and the build platform. The second adhesion force may be measured per unit area of the interior portion on the build platform, and may, in general, be less than the first adhesion force. As discussed above, the terms "measured" and "on the build platform" are intended to characterize the generally lower adhesion force per unit of area within the interior region relative to the exterior region, and any interpretation of these phrases consistent with this result should fall within the scope of this description. Thus, the raft may overall be more securely anchored to the build platform around the perimeter, in the exterior region, than within the interior, to facilitate easy removal of the raft and/or the printed object from the build platform while resisting curling, warping, and other artifacts of thermally-induced shrinkage and stress or the like.

In general, raft-to-build platform adhesion may be controlled using one or more of: varying the volume of build material deposited, varying the printing height, using different build patterns, and varying the size of the exterior portion. One or more of these techniques may be implemented through setting parameters for the interior and exterior portions accordingly as discussed herein (e.g., the first and second set of fabrication parameters). Where the pattern controls adhesion, this may, for example, include patterns with more or less contact surface between the raft and the build platform. Thus, for example, increasing the number of segments included per unit area of the raft pattern may increase the contact surface and the corresponding per-unit-of-area adhesion forces. Similar techniques may also or instead be employed, such as by anchoring corners with squares or circles of a completely filled pattern to maximize surface contact in those areas (e.g., with 100% fill). These areas of maximum surface contact may extend beyond the regular geometry of the raft as pads or the like, or they may be embedded within the regular geometry, e.g., within corners of a rectangle or the like. The first and second set of fabrication parameters may thus be configurable. As an example, a user, a computer program product, or a combination thereof that generates tool instructions for printing the raft and three-dimensional object may configured the first set of fabrication parameters and/or the second set of fabrication parameters.

In an aspect, creating a second adhesion force less than the first adhesion force (e.g., for greater adhesion of the exterior portion to the build platform relative to the adhesion of the interior portion to the build platform) may be achieved by varying the volume of build material. This may include having a greater volume of build material in the exterior portion relative to the interior portion. This is because, for a given build material, a greater volume of build material per unit area on the surface of the build platform increases adhesion as more build material is present to adhere to the build platform.

Increasing the volume of build material in the exterior portion may be accomplished by one or more of: depositing more build material per unit of length, having tighter build patterns with less spacing between deposited lengths (e.g., covering a region with more line segments), and so on. For example, in implementations, fabricating the exterior portion of the first layer of the raft may include depositing build material at a first volumetric rate per unit of length, and fabricating the interior portion of the first layer of the raft may include depositing build material at a second volumetric rate per unit of length, where the first volumetric rate is greater than the second volumetric rate. Thus, more build material (per deposited length) may be provided in the exterior portion relative to the interior portion.

In another aspect, a second adhesion force less than the first adhesion force (e.g., for greater adhesion of the exterior portion to the build platform relative to the adhesion of the interior portion to the build platform) may be achieved by varying the printing height. In general, a higher printing height above a surface of the build platform creates less adhesion due to the decreased force applied by the extrusion tool to the extrudate toward a receiving surface. That is, the extraction tool tends to press the extrudate into the surface more firmly when the tool is closer to the build platform, thus creating a greater bonding force as the material solidifies. Thus, in implementations, fabricating the exterior portion of the first layer of the raft may include depositing build material at a first z-axis height above the build platform, and fabricating the interior portion of the first layer of the raft may include depositing build material at a second z-axis height above the build platform, where the second z-axis height is greater than the first z-axis height. In other words, the interior portion may be printed at a greater printing height than the exterior portion of the raft. It will be appreciated that this height differential may be executed in sub-resolution step sizes. For example, where the minimum deposition layer height is one millimeter, a layer may (where the system hardware and software permits) be deposited 0.95 millimeters above the prior surface to achieve greater adhesion.

By controlling height, more "drooping" may also be introduced into the interior than the exterior portion, where drooping refers to the vertical distance that the build material will drop to reach the surface upon which it is being printed. Increased drooping may promote deposited build material to contract and pull off the build platform, thereby facilitating relatively easy removal of these drooped portions as compared to portions printed at lower droop distances.

In general, vertical distances described herein refer to steps in processing height. This may imply, but does not necessarily require, a specific resulting height in a layer. Thus, for example, when a layer is "fabricated" at a particular height, this may mean that an extruder (such as any described above with reference to FIG. 1), nozzle, or other mechanism is positioned within a build volume of a three-dimensional printer to fabricate at that height, or at some corresponding vertical position that results in a layer fabricated at that height. This may be accomplished through moving the extruder or the like along the z-axis, moving the build platform along the z-axis, or any combination thereof. Fabrication at a particular height may specifically mean that the fabrication results in layers of the specified height, or some consistent processing offset to such specified height. The actual height achieved in any particular layer may depend on the vertical position of any underlying surfaces, the volumetric flow rate of deposited material, the speed of extrusion, the type of build material being used or temperature thereof, or any of a variety of other factors. More generally, while processes are described in terms of a processing height, the resulting height may thus, in certain circumstances, be different than a vertical height of the extruder. Accordingly, terms such as height, processing height, droop height or distance, or the like are not intended to refer to a specific absolute height and, instead, refer to a consistent relative value from layer to layer within a printing process. Thus, for example, a height may refer to the actual height of an extruder nozzle at which an extruder deposits material, or to the actual height of a resulting layer, or any other suitable frame of reference for consistently determining a height as that term is used herein.

In implementations, the difference in adhesion force may be achieved by using different build patterns such as, for example, with varying density of segments included therein, spacing, or the like. For example, in an aspect, fabricating the exterior portion of the first layer of the raft may include depositing build material using a first build pattern, and fabricating the interior portion of the first layer of the raft may include depositing build material using a second build pattern different from the first build pattern.

The first build pattern and the second build pattern may each include segments of build material, where the segments of build material of the first build pattern are spaced closer together on average than the segments of build material of the second build pattern. Thus, the second build pattern may substantially cover the interior portion, but with fewer line segments per unit area than the first build pattern.

The second build pattern may also or instead include elongate strips of build material deposited in substantially straight lines. Thus, for example, the raft may include straight lines instead of squiggles (or curved lengths) across its middle region (i.e., the interior portion). In an aspect, for example as shown and described in greater detail below with reference to FIG. 10, the elongate strips of build material may be included in one or more groups. These groups of elongate strips may, for example, form a lever pivotable about an axis transverse to the respective longitudinal dimension of each elongate strip to facilitate removal of the raft from the build platform.

In certain implementations, the second build pattern substantially uniformly diffuses heat of deposited build material.

In some implementations, the difference in adhesion force is achieved by varying the size of the exterior portion. For example, the magnitude of the first adhesion force relative to the magnitude of the second adhesion force may be a function of the size of the exterior portion relative to the size of the interior portion. In such instances, a size of the exterior portion relative to the interior portion may be selected to provide the relative magnitude of the first adhesion force to the magnitude of the second adhesion force. In an aspect, the size of the exterior portion is about 30% greater than a size of the interior portion (e.g., greater than about 50% greater than a size of the interior portion).

Other techniques may also or instead be implemented to provide improved adhesion characteristics for the first layer of the raft to the build platform. For example, different materials may be utilized for the exterior portion than the materials that are used for the interior portion. For example, a build material that has a greater adhesion to the build platform may be used for the exterior portion of the first layer of the raft and a build material that has a lesser adhesion to the build platform may be used for the interior portion of the first layer of the raft. Additionally, or alternatively, different temperatures may be used, e.g., different temperatures of the build material (or an extruder for the build material), different temperatures of a build volume, different temperatures of a build platform, or combinations thereof.

In some aspects, a gap may be formed between the exterior portion and the interior portion of the raft. The gap can provide a transition area to switch between fabrication of the exterior portion and fabrication of the interior portion. For example, in the gap, fabrication parameters can be switched between the first set of fabrication parameters and the second set of fabrication parameters.

In certain aspects, a cutout may be formed into the raft, where a tool is insertable into the cutout for aiding removal of the raft from the build platform. For example, the raft may include a wedge cutout or the like and a spatula-like tool with a corresponding shape may be used to remove the raft from the build platform. The cutout may be disposed in one or more layers of the raft such as, for example, the first layer.

The build platform may also or instead be flexible. This may allow for a user to flex, twist, or bend the build platform to aid in removing the raft from the build platform.

As shown in step 206, the method 200 may include fabricating additional layers of the raft. The exterior portion and the interior portion, as described herein, may be located on only the first layer of the raft such that the additional layers of the raft are fabricated according to different characteristics, patterns, and/or parameters. As also described herein, the exterior portion and the interior portion may be disposed in subsequent layers deposited above the first layer of the raft such that the additional layers of the raft (or portions thereof) continue the characteristics, patterns, and/or parameters included in the exterior portion and the interior portion.

Fabricating additional layers of the raft may include fabricating a second layer of the raft above the build platform, fabricating a third layer of the raft above the build platform, and so on. In certain implementations, at least one of the additional layers of the raft may be deposited at a z-axis height within build material of the layer immediately beneath. For example, and as shown and described with reference to FIG. 9 below, at least one portion of a second layer of the raft may be deposited at a z-axis height within build material of the first layer of the raft. The portion of the second layer of the raft that is deposited within build material of the first layer of the raft may be located in the interior portion of the raft, in the exterior portion of the raft, or both. Such deposition of layers may, for example, advantageously increase adhesion between raft layers and, additionally or alternatively, may reduce the likelihood of pieces breaking off and remaining on the build plate.

As shown in step 208, the method 200 may include fabricating a platform above the first layer of the raft such as, for example, on top of additional layers of the raft printed upon the first layer to provide stability and structure to the raft. The platform may provide support for the three-dimensional object.

As shown in step 210, the method 200 may include fabricating a projection extending from the platform, where the projection is engageable (e.g., by a user) to facilitate imparting force on the raft as the raft is removed from the build platform. More specifically, the projection may provide a structure for a user, a component of the three-dimensional printer, a piece of external machinery, or a combination thereof to engage to facilitate removal of the raft from the build platform, removal of the three-dimensional object from the raft, or both. The projection may be disposed, for example, on a top portion of the platform of the raft. The projection may also or instead be disposed along an outer edge of the platform of the raft.

The projection may include an elongate bar disposed along the top portion of the raft and/or along an outer edge of the platform of the raft. The elongate bar may, additionally or alternatively, include one or more support structures extending between the elongate bar and the platform of the raft. The one or more support structures may, for example, aid in adhering the elongate bar to the platform of the raft.

The projection may, further or instead, include a tab disposed on one or more of an outer edge of the platform of the raft and a top portion of the platform of the raft. The tab may define, for example, an aperture. In such implementations, the tab and the aperture may be sized and shaped to facilitate engagement of the tab with a removal device extending at least partially through the aperture.

As shown in step 212, the method 200 may include fabricating the three-dimensional object on the raft. Fabricating the three-dimensional object on the raft may commence when the raft is complete, which occurs after remaining portions of the raft are fabricated after the exterior and interior portions of the raft as described herein (e.g., printing the first layer of the raft according to a first and second set of parameters for the exterior and interior portions of the raft, respectively). The remaining portions of the raft above the first layer may be printed according to one or more of the parameters for one or more of the exterior portion and the interior portion of the raft, or according to different parameters. In some implementations, after the first layer of the raft is printed according to the exterior portion and the interior portion of the raft as discussed above, the remaining layers of the raft may be printed in a rectilinear pattern or any other suitable pattern to provide a base upon which the three-dimensional object may be fabricated. In certain implementations, the first layer of the raft may be printed according to the exterior and interior portions of the raft as discussed above, intermediate layers of the raft may be printed in a rectilinear pattern or another suitable pattern known in the art, and one or more top layers may be printed in a specific pattern to provide improved adhesion characteristics between the raft and the three-dimensionally printed object. In some implementations, one or more layers above the first layer of the raft may be printed in accordance with the parameters for the exterior portion and the interior portion of the raft described herein. For example, respective portions of one or more layers above the first layer of the raft may be printed in accordance with the parameters for the corresponding exterior portion and the interior portion of the raft.

As stated above, the parameters for the exterior portion and interior portion of the raft may be configurable. For example, the following parameters may be adjustable: depth of travel into the raft before the interior portion is reached; a gap between the exterior portion and the interior portions, which may be taken out of the interior portion; the volume of the interior portion compared to the exterior portion (e.g., as a percentage); and how far to droop the printing of the interior portion of the raft (e.g., in millimeters).

Figure 3:
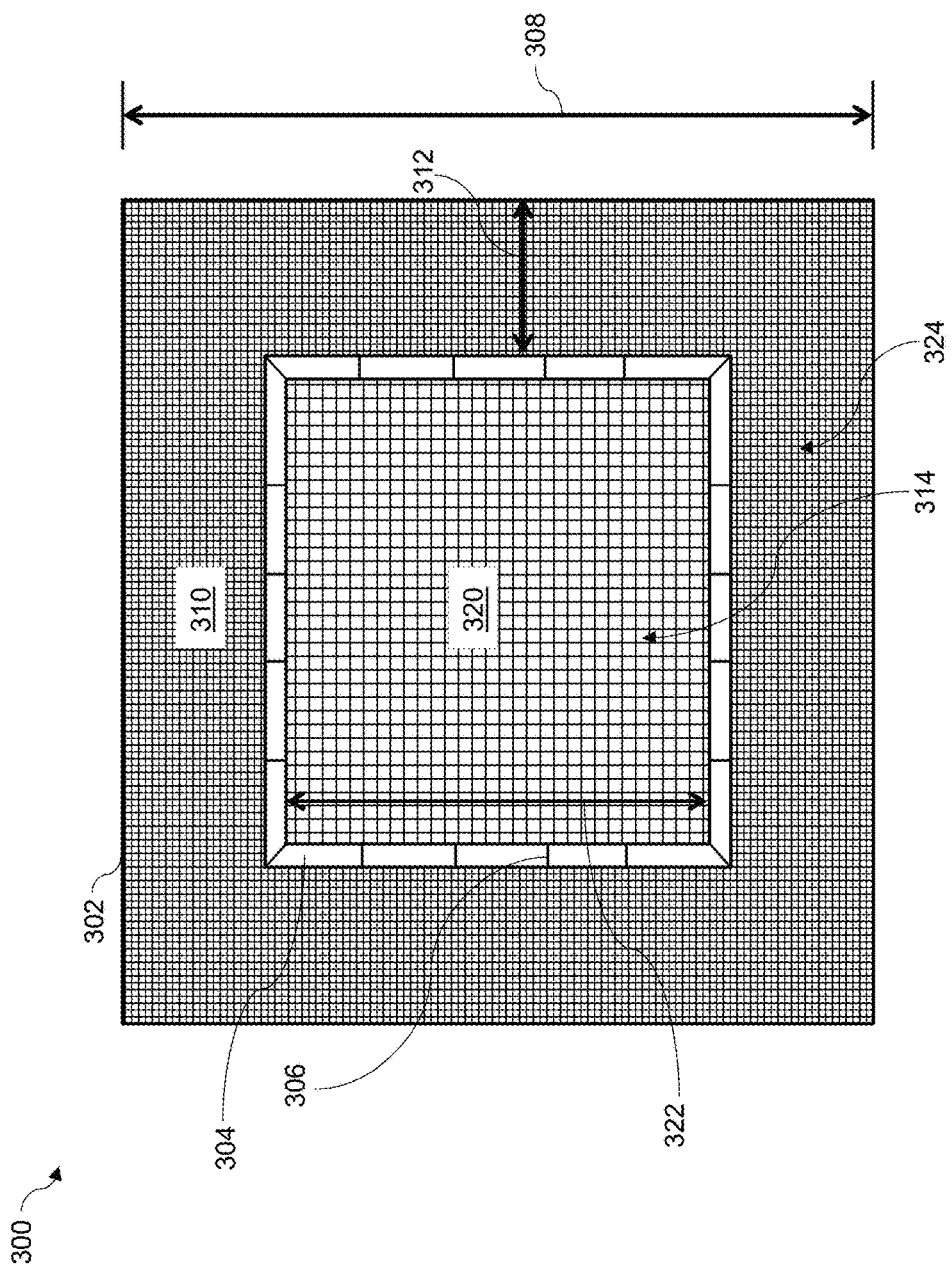
FIG. 3 is a top view of a first layer of a raft.

FIG. 3 is a top view of a first layer of a raft. The raft 300 may be any as described herein, and, thus, may be useful for leveling and to prevent warping of an object being fabricated in a three-dimensional printing process. Although the raft 300 is shown as a substantially square shape in the figure, one skilled in the art will recognize that other shapes are instead or additionally possible, including other polygons or curved shapes (e.g., circles, ovals, etc.). The raft 300 may include a border 302, an exterior portion 310, and an interior portion 320.

The border 302 may form the exterior outline or perimeter of the first layer of the raft 300 or of the raft 300 in general. A base layer of a three-dimensional object to be fabricated on the raft 300 may be disposed within the border 302 of the raft 300 such that the entire three-dimensional object is supported by the raft 300.

The exterior portion 310 may be disposed adjacent to or near the border 302 of the raft 300. The interior portion 320 may be contained within the exterior portion 310 and, in certain implementations, the exterior portion 310 may completely surround the interior portion 320.

The exterior portion 310 may include a width (shown by the first arrows 312) providing a first adhesion force between the exterior portion 310 of the raft 300 and a build platform of a three-dimensional printer. The width of the exterior portion 310 may extend around the entire border 302 of the raft 300. That is, the exterior portion 310 may extend for the entire length or width of the raft 300 (as shown by the second arrows 308) on all sides of the raft 300. The interior portion 320 may include one or more predetermined dimensions (as shown by the third arrows 322) surrounded by the width of the exterior portion 310 on all sides. For example, the raft 300 may be substantially a 10-centimeter square such that the dimension of the second arrows 308 is about 10 centimeters, and the exterior portion 310 may additionally, or alternatively, be about 2 centimeters throughout the width of the raft 300 (i.e., the dimension of the first arrows 312 is about 2 centimeters).

As shown in FIG. 3 by way of representation, the exterior portion 310 may be fabricated by depositing build material using a first build pattern 314 and the interior portion 320 may be fabricated by depositing build material using a second build pattern 324 different from the first build pattern 314. It will be understood that the build patterns shown in FIG. 3 are provided by way of representation only, and may differ from actual build patterns used for the first build pattern 314 and the second build pattern 324. However, as shown in FIG. 3, the first build pattern 314 may include segments (e.g., lengths) of build material spaced closer together on average than segments of build material included in the second build pattern 324. The second build pattern 324 may also or instead include segments of build material deposited in substantially straight lines. The second build pattern 324 may also or instead be selected to provide substantially uniform heat diffusion of deposited build material.

In general, the build patterns used for fabrication of the exterior portion 310 and the interior portion 320 may include a rectilinear pattern, such as the pattern shown in FIG. 3, or any other suitable pattern according to the object being fabricated, the shape of the build platform, the capabilities of a robotic positioning system, and so forth. The build patterns of one or more of the exterior portion 310 and the interior portion 320 may form a base layer having a maximum segment length for reducing the likelihood of warping of the base layer away from the build platform. In general, long runs of material with a relatively high coefficient of thermal expansion (e.g., thermoplastics and the like), when adhered to a material with a relatively low coefficient of thermal expansion (e.g., aluminum and the like) will tend to delaminate and warp away due to thermally induced stresses during cooling. To mitigate these effects, long runs in the base of a raft 300 may be avoided by using a number of reduced-length segments for the build patterns of one or more of the exterior portion 310 and the interior portion 320. Between these reduced-length segments, any of a variety of techniques may be employed including physical gaps or discontinuities, accordion-like structures that can expand to accommodate shrinking straight segments, returns or U-turns that double back on a current pattern, or any other features or combination of features that prevent straight line segments exceeding the length limit.

The raft 300 may include a gap 304 formed between the exterior portion 310 and the interior portion 320. The gap 304 may be formed with one or more links 306 including segments of build material bridging the gap 304 between the exterior portion 310 and the interior portion 320 such that the raft 300 is a singular unit. The gap 304 may also or instead be bridged by a layer (e.g., an interface layer) printed above the first layer of the raft 300. For example, the first layer of the raft 300 may include the exterior portion 310, the interior portion 320, and an unbridged gap 304 between the exterior portion 310 and the interior portion 320 such that the exterior portion 310 and the interior portion 320 are completely separate. Continuing with this example, a layer printed above the first layer (e.g., the second layer) may connect the exterior portion 310 and the interior portion 320 of the raft 300 such that they can be removed together.

Figure 4:
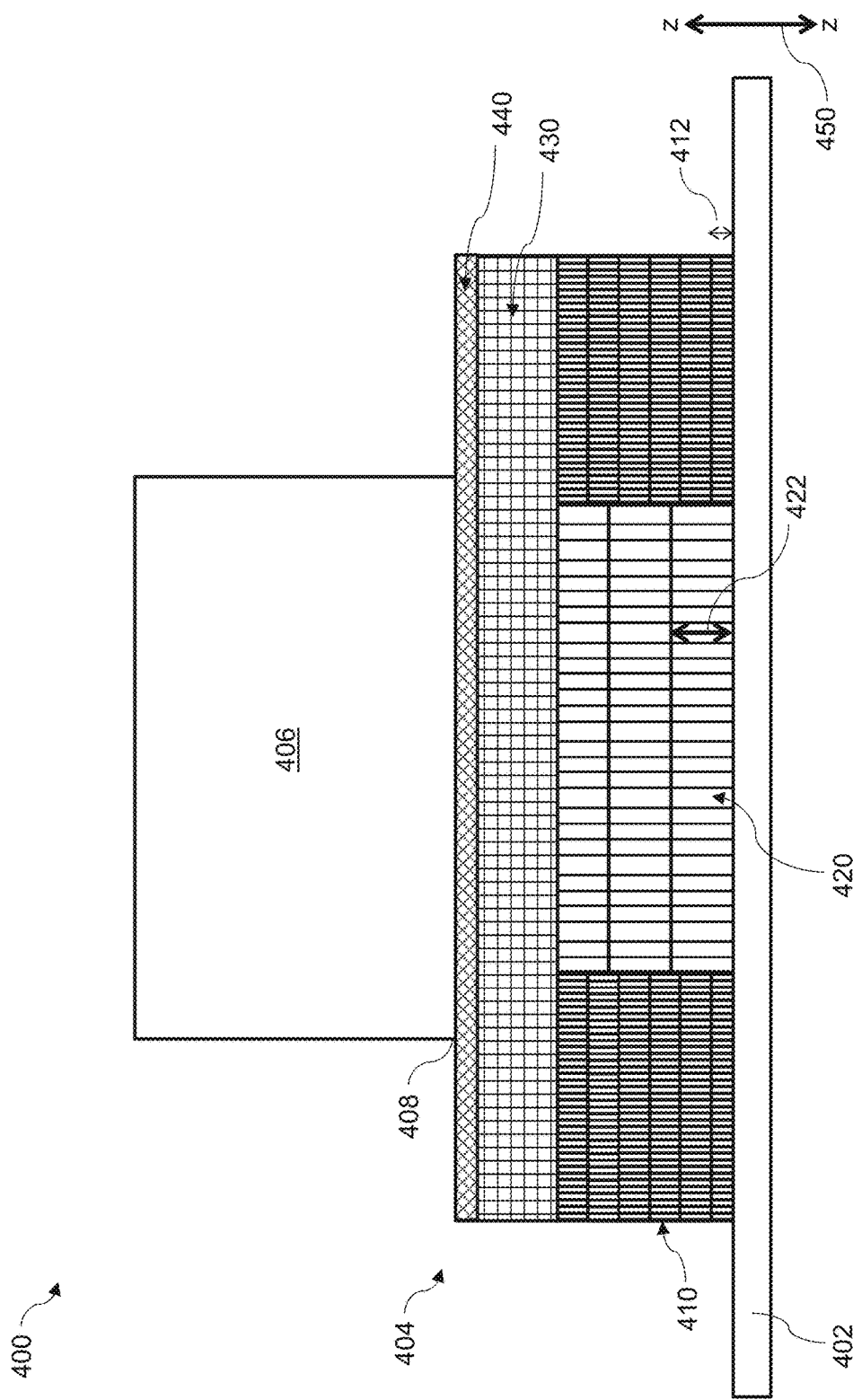
FIG. 4 is a cross-sectional view of a raft in a three-dimensional printing system.

FIG. 4 is a cross-sectional view of a raft in a three-dimensional printing system. The system 400 may include a build platform 402, a raft 404, and a three-dimensional object 406 fabricated on the raft 404.

The build platform 402 may include any one or more of the build platforms described herein and, thus, may include a flexible build platform and the like for a three-dimensional printer.

The raft 404 may be any one or more of the rafts described herein. In general, the raft 404 may include one or more layers fabricated on the build platform 402 to support the three-dimensional object 406. The raft 404 may include multiple layers such as a base layer (i.e., the first layer) deposited on the build platform 402, one or more intermediate layers 430, and a top layer 440 to support the three-dimensional object 406.

The first layer of the raft 404 may include an exterior portion 410 near a border of the raft 402, where the border of the raft 404 is disposed outside of a perimeter 408 of a base layer of the three-dimensional object 406 being fabricated on the raft 404. The first layer of the raft 404 may further include an interior portion 420 contained within the exterior portion 410.

As shown in FIG. 4, the exterior portion 410 may be fabricated at a first z-axis height 412 (along a z-axis 450) above the build platform 402 and the interior portion 420 may be fabricated at a second z-axis height 422 above the build platform 402, where the second z-axis height 422 is greater than the first z-axis height 412. The exterior portion 410 may also or instead be fabricated using a first build pattern that includes segments of build material spaced closer together on average than a second build pattern used to fabricate the interior portion 420 of the raft 404.

In certain implementations, one or more of the parameters included in a set of fabrication parameters for printing the first layer (i.e., the exterior portion 410 and the interior portion 420) may also be used for fabricating layers above the first layer, e.g., a second layer, a third layer, and so on. In some implementations, only the first layer is printed using the particular set of fabrication parameters for the exterior portion 410 and the interior portion 420, and layers above the first layer (e.g., a second layer, a third layer, and so on) are fabricated using a standard rectilinear build pattern or the like. As used herein, the first layer may include the first layer of the raft 404 fabricated on the build platform 402. The second layer, third layer, and so on, may include any layer printed above or on top of the first layer.

The intermediate layers 430 may include any layer printed between the first layer and the top layer 440. In an aspect, the intermediate layers 430 are fabricated using a standard rectilinear build pattern or the like.

The top layer 440 may include the layer of the raft 404 upon which the three-dimensional object 406 is fabricated (e.g., a platform or the like). The top layer 440 may be fabricated based on a specific set of fabrication parameters for providing desired adhesion characteristics for the raft 404 and three-dimensional object 406. For example, the top layer 440 may be fabricated according to a third set of fabrication parameters, with the exterior portion 410 and the interior portion 420 fabricated according to a first of fabrication parameters and second set of fabrication parameters, respectively. In an aspect, the third set of fabrication parameters includes a specific build pattern and, thus, the top layer 440 may be deposited using a specific build pattern that provides advantageous heat diffusion.

The devices, systems, and methods described herein may create a raft in which a region around a perimeter of the raft is tightly bonded such that any pulling or warping forces cannot pull the raft off the build plate, while the interior region of the raft has less adhesion so the raft can be easily removed. That is, is should be appreciated that, if the raft is tightly bonded throughout (and not just in its exterior portion), such a raft could be difficult for a user to remove.

While rafts have been described as having an exterior portion with a greater adhesion force to the build platform as compared to an adhesion force between the build platform and an interior portion of the raft, other distributions of adhesion force are additionally or alternatively possible. For example, in certain implementations, a raft can include an interior portion having a greater adhesion to the build platform as compared to an adhesion force between the build platform and an exterior portion of the raft.

Figure 5:
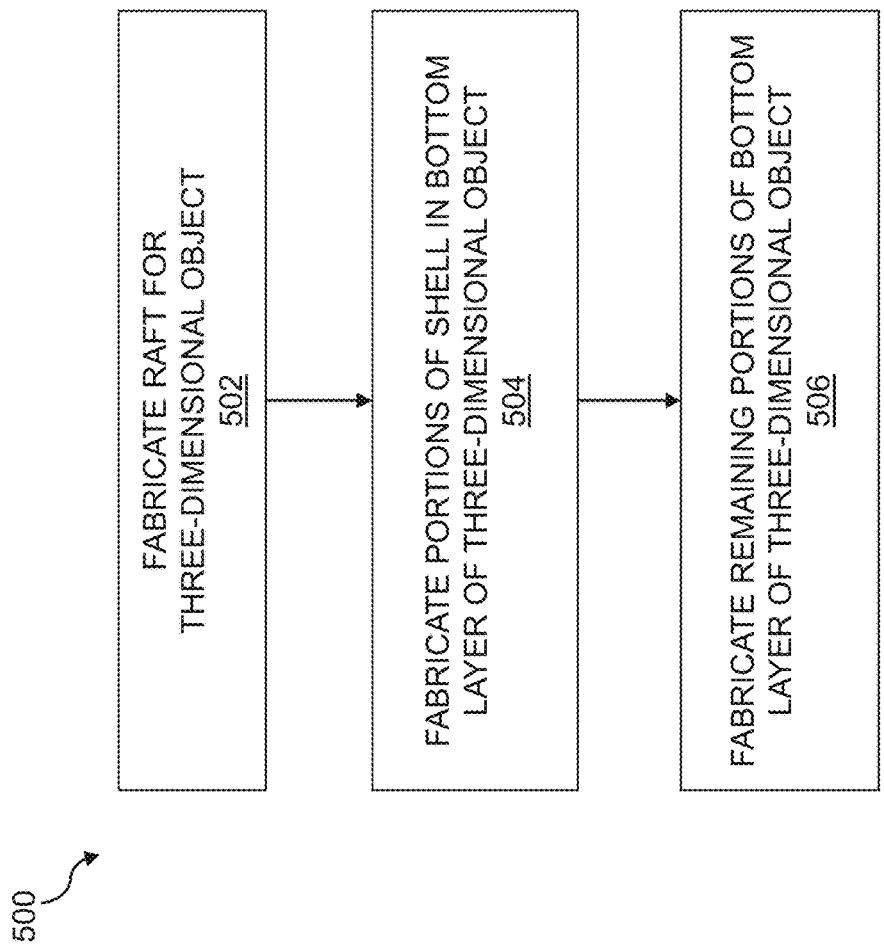
FIG. 5 is a flow chart of a method for fabricating a raft and a three-dimensional object.

FIG. 5 is a flow chart of a method for fabricating a raft and a three-dimensional object. The method 500 may be implemented to control raft-to-printed object adhesion in three-dimensional printing through, for example, using specific build patterns for the top layer of the raft, printing the portions of the shell of the three-dimensional object located on a bottom layer of the three-dimensional object at smaller droop distances, and depositing a thicker bottom layer of the three-dimensional object.

In general, the method 500 may include rafts and/or three-dimensional objects such that the exterior regions (shells) of the three-dimensional objects have a higher adhesion to the raft than the interior regions of the three-dimensional objects. This may be advantageous to prevent cording in the shells of three-dimensional objects. As used herein, such cording includes straight lines forming in an arc-shaped pattern because of the build material pulling off of the build platform as the extruder or the like traverses the arc-shaped build path. By way of an additional or alternative example, cording can include straight lines forming in an arc-shaped pattern at turns in a build pattern, e.g., sharp turns forming a point, where the material pulls off of the build platform, thus distorting the desired build pattern.

As shown in step 502, the method 500 may include fabricating a raft to support a three-dimensional object on a build platform of a three-dimensional printer. The raft may include a top layer that, in use, contacts a bottom layer of the three-dimensional object.

In an aspect, at least a portion of the top layer of the raft is fabricated using a first build pattern. The portion of the top layer of the raft that is fabricated using a first build pattern may include portions of the top layer that will contact the base layer of the three-dimensional object, as well as contacting immediately surrounding areas. For example, the entire top layer of the raft may be fabricated using the first build pattern.

The first build pattern may provide substantially uniform heat diffusion of deposited segments of build material. The first build pattern may, thus, include linear segments of build material that are initially spaced apart from one another, with the resulting gaps or offsets filled in by subsequent deposition passes. In this manner, each straight segment of material can cool independently before bonding to other adjacent segments of material. Such independent cooling can avoid or mitigate non-axial stresses on each linear segment of material as it cools. More specifically, the first build pattern may be formed by depositing offset, consecutive segments of build material and filling gaps in the offset, consecutive segments of build material after the deposited material is allowed to cool, facilitating the formation of uniform, symmetric thermal patterns (and associated shrinkage patterns).

As shown in step 504, the method 500 may include fabricating first portions of a shell of the three-dimensional object included in a bottom layer of the three-dimensional object. The first portions of the shell included in the bottom layer may be in contact with and have a first adhesion force with the top layer of the raft, where the first adhesion force is measured per unit area of the first portions of the shell on the raft.

The portions of the shell of the three-dimensional object may include all portions of the exterior surface of the three-dimensional object and/or all portions of the interior surface of the three-dimensional object included in the bottom layer of the three-dimensional object. The portions may also, or instead, include a predetermined area adjacent to these portions. The predetermined area may be, for example, all areas included within about 2 millimeters from the shell of the object.

As shown in step 506, the method 500 may include fabricating second portions of the bottom layer of the three-dimensional object. These second portions may include, for example, the remaining portions of the bottom layer of the three-dimensional object. The second portions of the bottom layer of the three-dimensional object may be in contact with, and have a second adhesion force with, the top layer of the raft, where the second adhesion force is measured per unit area of the second portions of the bottom layer on the raft. In implementations, the second adhesion force is less than the first adhesion force. Thus, in such implementations, the portions of the shell of the three-dimensional object may include a greater adhesion to the top layer of the raft than the adhesion between remaining portions of the bottom layer of the three-dimensional object and the top layer of the raft.

In an aspect, the second adhesion force less than the first adhesion force (e.g., for greater adhesion of the shell of the three-dimensional object to the raft relative to the adhesion between the raft and the remaining portions of the three-dimensional object) is provided by varying the printing height. For example, in implementations, fabricating the first portions of the shell of the three-dimensional object includes depositing build material at a first z-axis height above the top layer of the raft and fabricating the second portions of the bottom layer of the three-dimensional object includes depositing build material at a second z-axis height above the top layer of the raft, where the second z-axis height is greater than the first z-axis height.

Additionally, or alternatively, the second adhesion force less than the first adhesion force (e.g., for greater adhesion of the shell of the three-dimensional object to the raft relative to the adhesion between the raft and the remaining portions of the three-dimensional object) may be provided by varying the amount of build material used. For example, in implementations, fabricating the second portions of the bottom layer of the three-dimensional object may include depositing build material at a volumetric rate per unit of length that is greater than a volumetric rate per unit of length used to deposit build material to form layers disposed above the bottom layer in the three-dimensional object. Thus, the bottom layer of the three-dimensional object may include a higher volume of build material deposited per area of the bottom surface than subsequent layers of the three-dimensional object.

The first portions of the shell of the three-dimensional object may be fabricated, for example, using a first set of fabrication parameters, and the second portions of the bottom layer of the three-dimensional object may be fabricated using a second set of fabrication parameters. The second set of fabrication parameters may be different from the first set of fabrication parameters.

Figure 6:
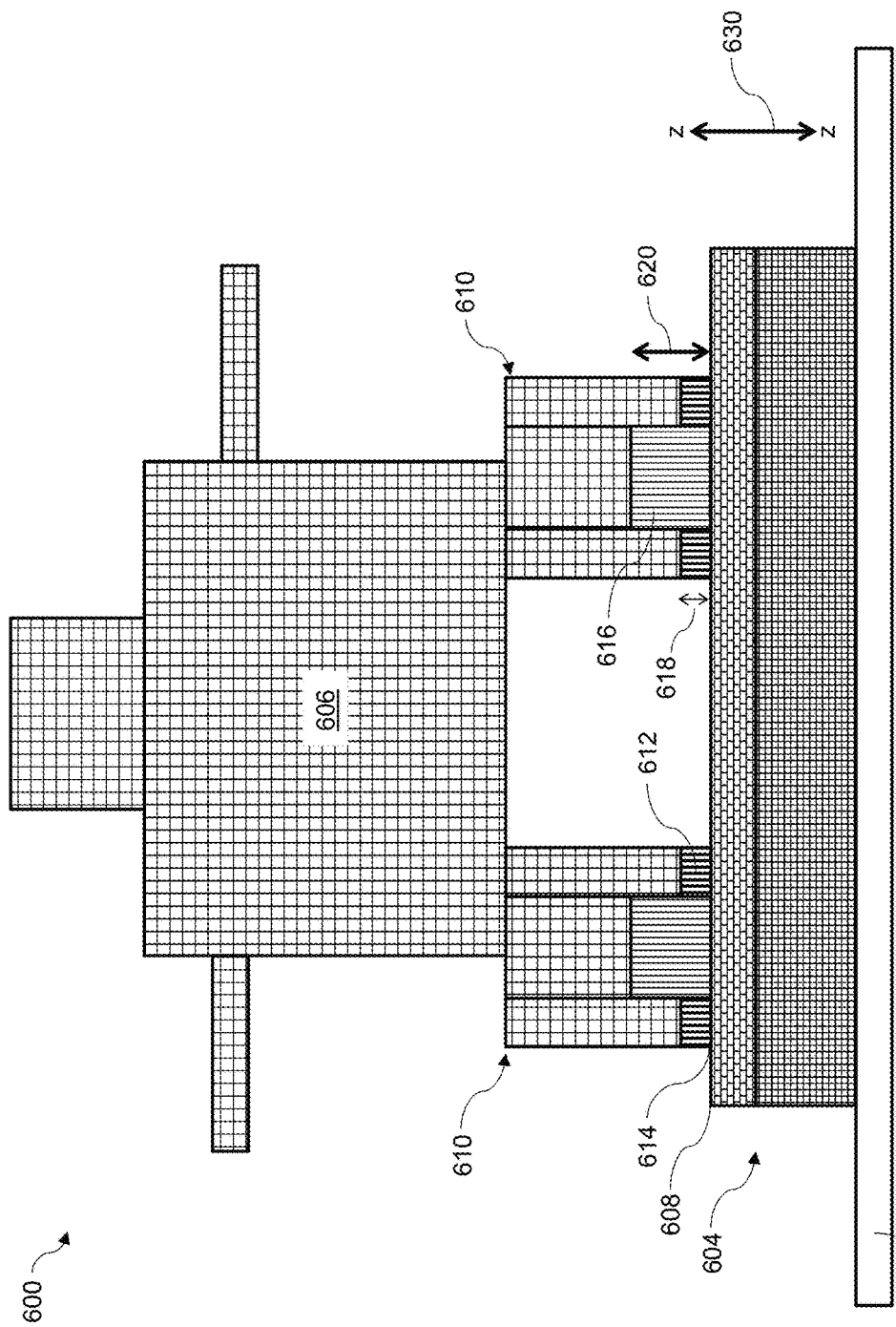
FIG. 6 is a cross-sectional view of a raft and a three-dimensional object in a three-dimensional printing system.

FIG. 6 is a cross-sectional view of a raft and a three-dimensional object in a three-dimensional printing system. The system 600 may include a build platform 602, a raft 604, and a three-dimensional object 606 fabricated on the raft 604.

The raft 604 may be any one or more of the rafts described herein. In general, the raft 604 may include one or more layers fabricated on the build platform 602 to support the three-dimensional object 606. The raft 604 may include multiple layers such as a base layer (i.e., the first layer) deposited on the build platform 602, one or more intermediate layers, and a top layer 608 (e.g., a platform) to support the three-dimensional object 606. The top layer 608 of the raft may be fabricated using a first build pattern different from the build pattern used for other layers of the raft 604.

The three-dimensional object 606 is shown, by way of example and not limitation, in the in FIG. 6 to resemble a substantially humanoid shape, where legs 610 form the base of the three-dimensional object 606 and make contact with the top layer 608 of the raft 604.

Portions of the shell 612 of the three-dimensional object 606 included in the bottom layer 614 may be printed using different fabrication parameters (e.g., a first set of fabrication parameters) than the remainder of the three-dimensional object 606, as represented by the different pattern fill used in FIG. 6. The first set of fabrication parameters may provide a first adhesion force between the portions of the shell 612 included in the bottom layer 614 and the top layer 608 of the raft 604.

Remaining portions 616 of the bottom layer 614 of the three-dimensional object 606 (e.g., portions disposed inside of the shell) may be printed using a second set of fabrication parameters different from the first set of fabrication parameters. The second set of parameters may provide a second adhesion force between the remaining portions 616 of the bottom layer 614 of the three-dimensional object 606 and the top layer 614 of the raft 604, where the second adhesion force is less than the first adhesion force. In an aspect, layers above the bottom layer 614 of the three-dimensional object 606 may be printed using known techniques.

The portions of the shell 612 of the three-dimensional object 606 included in the bottom layer 614 may be fabricated at a first z-axis height 618 (along a z-axis 630) above the raft 604. The remaining portions 616 of the bottom layer 614 of the three-dimensional object 606 may be fabricated at a second z-axis height 620 above the raft 604, where the second z-axis height 620 is greater than the first z-axis height 618. The portions of the shell 612 of the three-dimensional object 606 included in the bottom layer 614 may also or instead be fabricated using a build pattern that includes segments of build material spaced closer together on average than segments of a build pattern used to fabricate the remaining portions 616 of the bottom layer 614 of the three-dimensional object 606.

Figure 7:
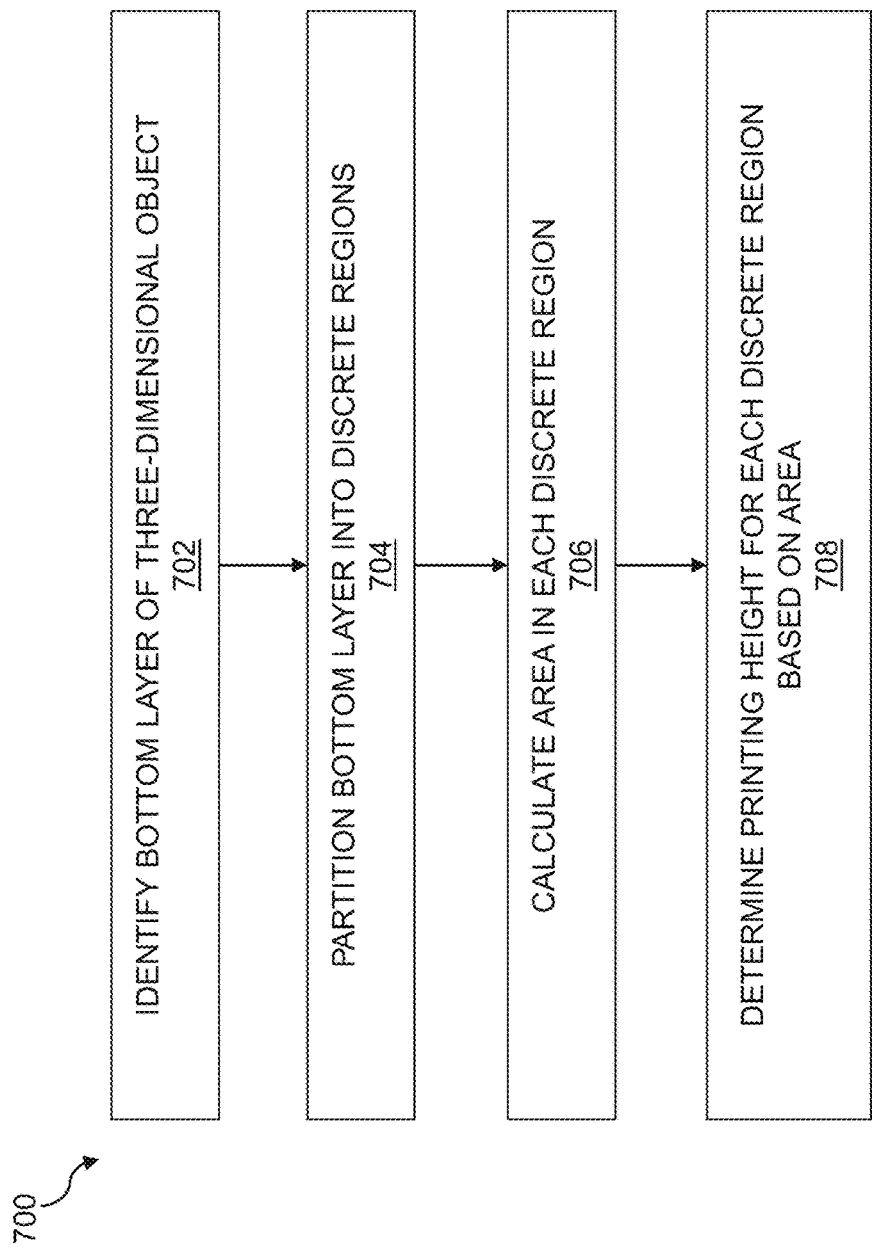
FIG. 7 is a flow chart of a method for varying a z-axis position of a nozzle in forming a first layer of an object fabricated on a raft.

FIG. 7 is a flow chart of a method for varying a z-axis position of a nozzle in forming a first layer of an object fabricated on a raft. The nozzle may be included on an extruder of a three-dimensional printer, such as any one or more of the extruders described herein. The method 700 may improve raft-to-printed object adhesion in three-dimensional printing through determining the printing height above the raft for fabricating the bottom layer of the printed object based on the size and shape of discrete regions of the bottom layer. In general, long skinny areas and smaller areas may be printed at lower heights for increased adhesion, while larger areas may be printed at higher printing heights.

As shown in step 702, the method 700 may include identifying, from a model of a three-dimensional object, a bottom layer of the three-dimensional object for contacting a top layer of a raft for supporting the three-dimensional object on a build platform of a three-dimensional printer.

As shown in step 704, the method 700 may include partitioning the bottom layer of the three-dimensional object into discrete regions. Partitioning the bottom layer into discrete regions may include selecting the discrete regions based on identifiable perimeters enclosing identifiable areas.

In an aspect, the discrete regions include isolated, enclosed areas of the bottom layer of the three-dimensional object in contact with the raft. For example, if the three-dimensional object were in the form of a person standing in an upright position, the discrete regions would include the soles of the shoes of the form of the person, or the soles of the feet of the form of the person. In certain designs, there may only be two discrete regions. However, in more complex designs, the discrete regions may be delineated further still. For example, continuing with the example of the three-dimensional object in the form of a person standing in an upright position, discrete regions may be created for the toes and for the ball/heel of the feet of the form of the person. Because the toes of the form of the person may have a smaller contact area with the raft than the contact area of the ball/heel of the feet of the form of the person, the discrete regions associated the toes can be printed at lower printing heights relative to the larger contact areas associated with the ball/heel of the feet of the form of the person.

The discrete regions may also or instead be identified and partitioned based upon whether the discrete regions enclose shapes meeting a predetermined area threshold, or otherwise based on the shape of areas of the bottom layer of the three-dimensional object in contact the raft. For example, portions of the bottom layer of the three-dimensional object may include thin lines or the like that are identified as discrete regions to be printed according to a first set of parameters different from a second set of parameters for enclosed shapes having relatively large areas—e.g., the thin lines may be printed closer to the raft than the larger area shapes.

The discrete regions may be identified, for example, by a processor that analyzes the bottom layer of the three-dimensional object, or manually by a user.

As shown in step 706, the method 700 may include calculating an area included in each discrete region.

As shown in step 708, the method 700 may include determining a printing height above the top layer of the raft for each of the discrete regions based on the calculated area. The printing height may be above a predetermined height when the calculated area is above a predetermined area. Similarly, the printing height may be below the predetermined height when the calculated area is below the predetermined area. The printing height for each of the discrete regions may also or instead be determined based on a function of the area and perimeter of the discrete regions, a function of a maximum cord length for a shape, a function of the shortest cord lengths for filling a shape, or any combination thereof.

In general, the method 700 above may be used to determine which portions of the bottom layer of a three-dimensional object should be printed at lower drooping distances than other portions. In an aspect, the method 700 compares a length of an outline of a region to the area of the shape the outline encloses. In an aspect, smaller outlined regions are printed closer to the raft, while larger outlined areas are printed higher from the raft. This may be useful for three-dimensional objects with small holes or the like in the bottom layer.

The foregoing description contemplates providing different adhesion properties for portions of rafts/objects fabricated in a three-dimensional printing process. Such different adhesion properties can be achieved through the control of one or more of numerous print parameters as described above or as known in the art—e.g., varying the volume of build material per unit length, varying the droop distances, varying the build patterns, and so on. In general, these techniques (and others) can be used to create profiles of extruded filament having a greater contact area with a surface upon which the filament is deposited. An example of this is shown in the figure below.

Figure 8:
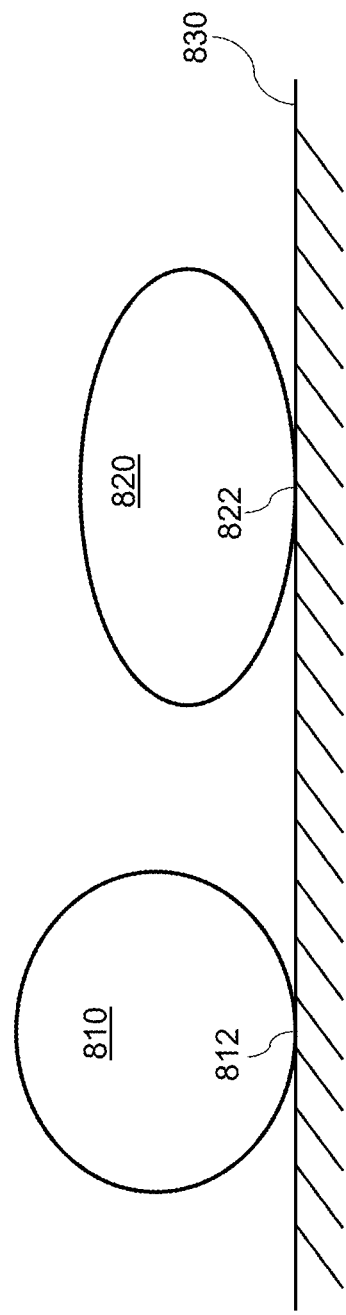
FIG. 8 shows cross-sections of segments of filament on a surface.

FIG. 8 shows cross-sections of segments of filament on a surface. Specifically, the figure shows a first filament 810 and a second filament 820 deposited on a surface 830, e.g., a build platform. The first filament 810 may include a substantially circular profile with a relatively small first contact surface 812 formed by the interface of the bottom of the filament and the surface 830. The second filament 820 may include a substantially oval profile (or otherwise a flattened circular profile) with a relatively large second contact surface 822 formed by the interface of the bottom of the filament and the surface 830. Because of the larger contact area provided by the second contact surface 822 as compared to the first contact surface 812, the second filament 820 may include a greater adhesion to the surface 830 as compared to the adhesion of the first filament 810 and the surface 830. This can be achieved through control of one or more of the print parameters as discussed herein. For example, by printing the filament closer to the surface, the extruder may force the material into the surface thereby flattening the profile of the extruded filament.

Figure 9:
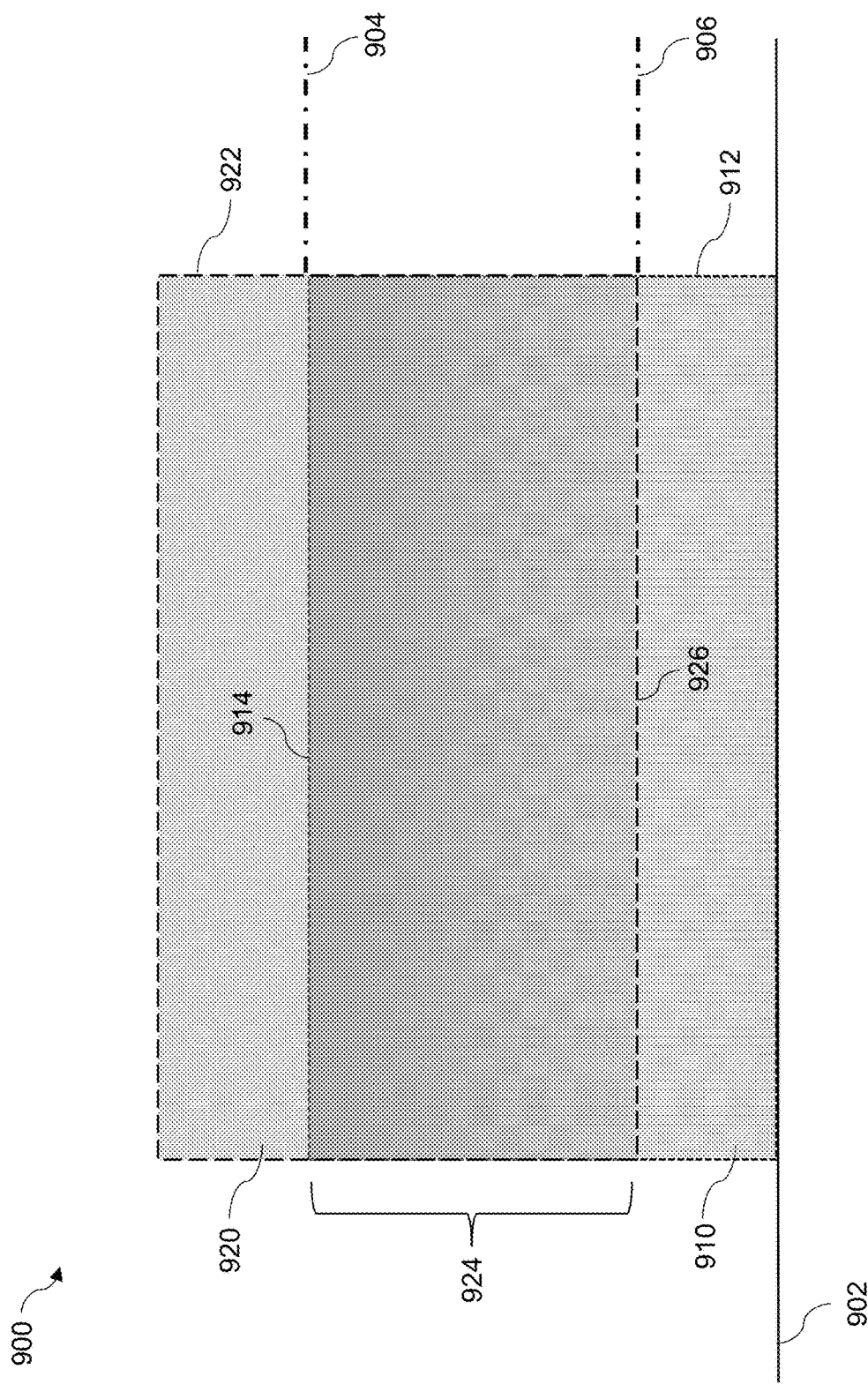
FIG. 9 is a cross-sectional view of deposited layers of a raft.

FIG. 9 is a cross-sectional view of deposited layers of a raft. Specifically, as shown in the figure, the raft 900 may include one or more layers deposited within space occupied by a layer immediately below. This approach can create layers of a raft 900 that are substantially fused together, where the raft 900 advantageously includes an increased adhesion between the layers contained therein. Using such techniques, a raft 900 may behave as a single sheet of printed material (e.g., a single plastic sheet) instead of separate independent pieces, which may reduce the likelihood of pieces of the raft 900 from breaking off (e.g., during removal or during printing) and, thus, facilitate removal of the raft 900. Using such techniques can also, or instead, aid in maintaining adhesion between the raft 900 and a build platform 902 of a three-dimensional printer.

For the sake of illustration, the raft 900 is shown in FIG. 9 as including a first layer 910 and a second layer 920. It should be appreciated, however, that the raft 900 may include additional layers. The first layer 910 has a boundary 912, shown as small dashed lines and the second layer 920 has a boundary 922 shown as larger dashed lines. As shown in FIG. 9, the second layer 920 of the raft 900 may be deposited above the build platform 902, where at least one portion 924 of the second layer 920 of the raft 900 is deposited at a z-axis height within build material of the first layer 910 of the raft 900. Specifically, a top portion 914 of the first layer 910 may be deposited at a first z-axis height 904, and a bottom portion 926 of the second layer 920 may be deposited at a second z-axis height 906 that is located beneath the first z-axis height 904 such that there is an overlapping portion 924 of the first layer 910 and the second layer 920. More specifically, a portion of the second layer 920 is printed within the first layer 910. The overlapping portion 924 may be located in one or more of the interior portion of the raft 900 and the exterior portion of the raft 900, and/or along other portions of the raft 900.

Figure 10:
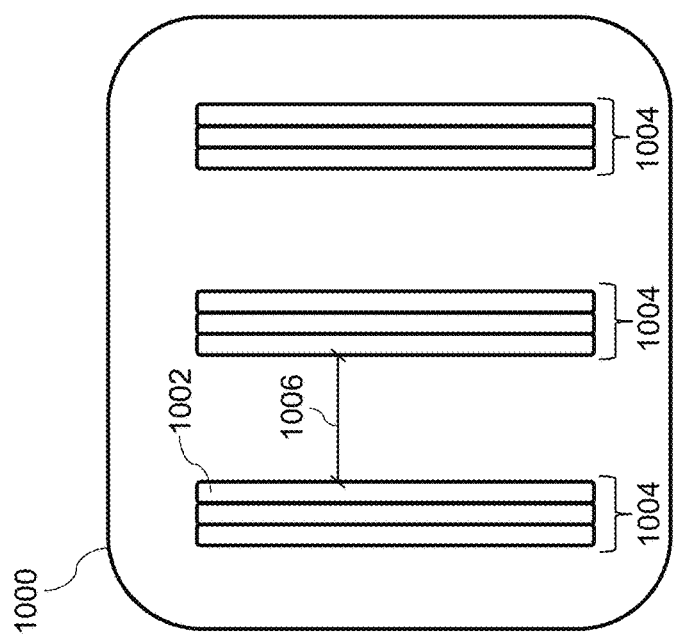
FIG. 10 is a top view of a portion of a first layer of a raft.

FIG. 10 is a top view of a portion of a first layer of a raft. The raft may include elongate strips 1002 of build material deposited in substantially straight lines according to any one or more of the various different methods described herein. These elongate strips 1002, when grouped together, may provide a sufficient stiffness to form a lever for removing the raft. Additionally, or alternatively, the lever formed by the elongate strips 1002 may be flexible enough to act only on a detaching region of the raft. Thus, for example, the elongate strips 1002 may facilitate relatively easy detachment of the raft from the build platform 1000 without substantially sacrificing adhesion of the raft to the build platform 1000.

Thus, a technique for fabricating a raft may include fabricating a first layer of the raft on the build platform 1000, where the first layer includes one or more groups 1004 of elongate strips 1002 of build material. Each group 1004 may include a plurality of the elongate strips 1002 of build material deposited directly adjacent to one another. Each group 1004 may be, for example, spaced apart from an adjacent group 1004 by a predetermined distance such that there is a gap 1006 formed between each group 1004. Additionally, or alternatively, the elongate strips 1002 may be directly adjacent to one another along a respective longitudinal dimension of each elongate strip 1002. In certain implementations, each group 1004 may include at least three elongate strips 1002 of build material in substantially straight lines directly adjacent to one another. The groups 1004 may form a lever pivotable to remove the raft from the build platform 1000. It should be appreciated that the lever may provide one or more of a predetermined stiffness to the raft and a predetermined adhesion force between the raft and the build platform 1000.

Figure 11:
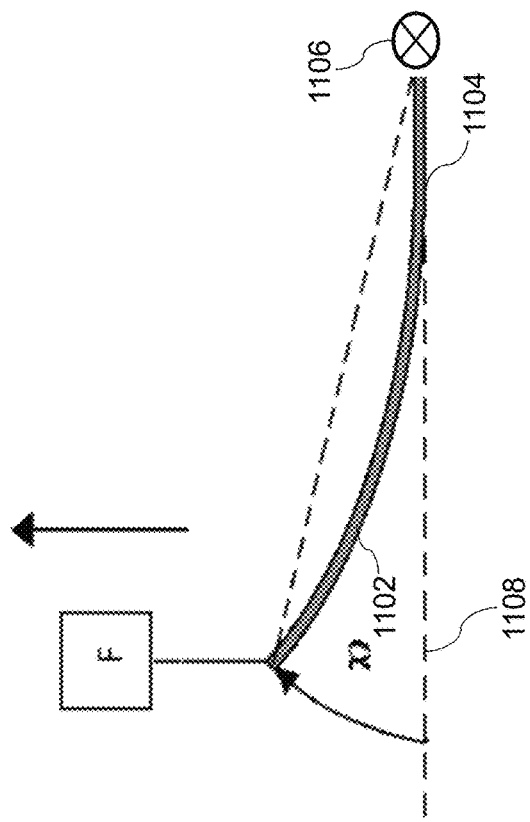
FIG. 11 is a schematic representation of a raft being removed from a build platform.

FIG. 11 is a schematic representation of a raft being removed from a build platform. The raft may include elongate strips of build material that, when grouped together, may form a lever 1102 for removing the raft from the build platform 1104 of a three-dimensional printer. The lever 1102 may be pivotable about an axis 1106 (shown extending into the page in FIG. 11) transverse to a respective longitudinal dimension of each elongate strip. For example, when a force is applied at location "F," shown in the figure in a direction substantially transverse to a longitudinal axis 1108 of the lever 1102, the lever 1102 may provide a flexibility to ease removal, e.g., as shown in the figure with the lever 1102 flexing along angle α.

Figure 12:
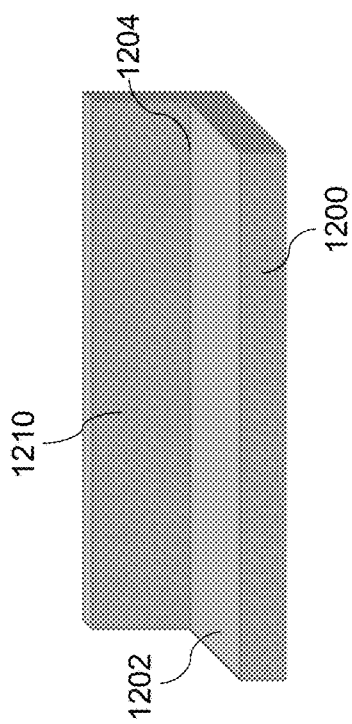
FIG. 12 is an isometric view of a raft.

FIGS. 12-16 are schematic representations of rafts including respective projections. In general, each projection may be included on an exterior of the respective raft. For example, each projection may be included on a top portion of the raft such as a platform that also supports a three-dimensional object fabricated thereon, on a side portion of the raft, or a combination thereof. Thus, techniques may include, for example, fabricating a platform for supporting the three-dimensional object above the first layer of the raft (e.g., according to any one or more of the techniques described herein), and, additionally or alternatively, fabricating a projection extending from the platform. The projection may be engageable to impart force on the raft as the raft is removed from the build platform FIG. 12 is an isometric view of a raft 1200. The raft 1200 may include a projection 1210 forming an elongate bar along the top portion 1202 of the raft 1200. The top portion 1202 may include a platform for supporting the three-dimensional object printed thereon. The projection 1210 may also or instead be disposed along an outer edge 1204 of the platform of the raft 1200. For example, the projection 1210 may be disposed along both the outer edge 1204 and the top portion 1202 of the raft 1200. Additionally, or alternatively, the projection 1210 may be disposed on a side portion of the raft 1200 such that the projection 1210 extends from a side and/or perimeter of the raft 1200.

The projection 1210 may be sized and shaped to facilitate engagement of the projection 1210 for removing the raft 1200 from the build platform of a three-dimensional printer. For example, the projection 1210 may be sized and shaped to facilitate a user manually engaging the projection 1210 and/or engaging the projection 1210 with an extraction tool. Thus, for example, the projection 1210 may be shaped as an elongate bar. It should be understood that such an elongate bar can create leverage for a user to peel a portion of the raft 1200 off of a build platform. For example, a user may press his or her thumb against the elongate bar to exert force sufficient to detach an edge of the raft 1200 from the build platform.

The projection 1210 may be disposed, for example, outside of the boundary of the three-dimensional object on the raft 1200. Further, or instead, the projection 1210 may be disposed in a location that works in conjunction with other design features of the raft 1200. For example, the projection 1210 may be disposed in a location that works in conjunction with design features (e.g., a lever formed by groups of elongate strips printed on a bottom layer of the raft 1200) that aid in removal of the raft 1200 from the build platform.

Figure 13:
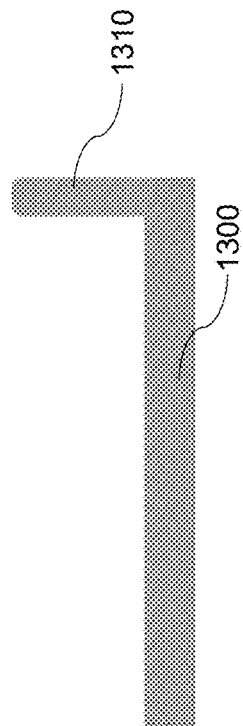
FIG. 13 is a side view of a raft with a projection in the shape of an elongate bar.

FIG. 13 is a side view of a raft 1300 with a projection 1310 in the shape of an elongate bar.

Figure 14:
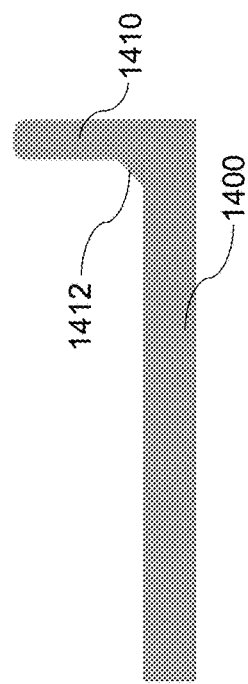
FIG. 14 is a side view of a raft including a projection and a support structure.

FIG. 14 is a side view of a raft 1400 with a projection 1410 and a support structure 1412. The projection 1410 can be, for example, in the shape of an elongate bar. Additionally, or alternatively, the support structure 1412 may extend between the projection 1410 (e.g., the elongate bar) and the raft 1400 (e.g., the platform of the raft 1400). The support structure 1412 may adhere the projection 1410 to the raft 1400.

Figure 15:
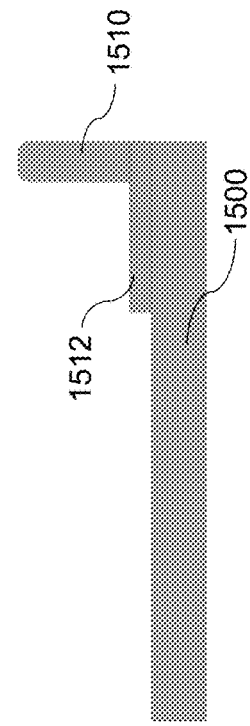
FIG. 15 is a side view of a raft including a projection and a support structure.

FIG. 15 also shows a side view of a raft 1500 with a projection 1510 and another embodiment of a support structure 1512.

Referring now to FIG. 16, a raft 1600 may include a projection 1610 forming a tab disposed on one or more of an outer edge 1604 of a platform of the raft 1600 and a top portion 1602 of the platform of the raft 1600. The tab may, for example, define an aperture 1612 such that the tab and the aperture 1612 are engageable with a removal device through the aperture 1612. The removal device may include a user's hand, an extraction tool, or combinations thereof. For example, the removal device may include a hook that hooks the tab through the aperture 1612. The removal device may also or instead include a component of the three-dimensional printer, such as the x-y-z positioning system or the like. For example, the extruder of a three-dimensional printer may include a structure that engages with the projection, where z-axis motion of the extruder can remove the raft 1600 from the build platform in a predetermined manner.

It will be understood that the projection described herein may also or instead include other shapes including, without limitation, a handle, a tether, a ring, an arm, a cam, a hook, a lip, and the like. The "projection" as described herein may also or instead include removal features of a raft that are inverted within the body of the raft itself such as holes, detents, cutouts, and the like.

While the foregoing description specifically contemplates removable rafts for interfacing three-dimensional objects to build platforms or the like, it will be appreciated that the principles of this disclosure may be readily adapted to other applications such as support structures or the like used in three-dimensional fabrication to provide elevated support in various regions of an object. Thus, it will be understood that unless explicitly stated otherwise or clear from the context, the term raft as used herein can include supports or support structures, and this disclosure specifically contemplates adaptations of the techniques herein to use with support structures for three-dimensional printing.

The raft techniques described herein may also be implemented using a computer program product comprising non-transitory computer-executable code embodied in a non-transitory computer readable medium that, when executing on one or more computing devices, generates tool instructions for fabricating the rafts, layers, objects, shells, and so on discussed herein.

The above systems, devices, methods, processes, and the like may be realized in hardware, software, or any combination of these suitable for the control, data acquisition, and data processing described herein. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. At the same time, processing may be distributed across devices such as the various systems described above, or all of the functionality may be integrated into a dedicated, standalone device. All such permutations and combinations are intended to fall within the scope of the present disclosure.

Embodiments disclosed herein may include computer program products comprising computer-executable code or computer-usable code that, when executing on one or more computing devices, performs any and/or all of the steps of the control systems described above. The code may be stored in a non-transitory fashion in a computer memory, which may be a memory from which the program executes (such as random access memory associated with a processor), or a storage device such as a disk drive, flash memory or any other optical, electromagnetic, magnetic, infrared or other device or combination of devices. In another aspect, any of the control systems described above may be embodied in any suitable transmission or propagation medium carrying computer-executable code and/or any inputs or outputs from same.

It will be appreciated that the devices, systems, and methods described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A method for fabricating a raft to support a three-dimensional object on a build platform of a three-dimensional printer, the raft including an exterior portion and an interior portion, the exterior portion near a border of the raft disposed outside of a perimeter of a base layer of the three-dimensional object to be fabricated on the raft, and the interior portion contained within the exterior portion, the method comprising:

fabricating the exterior portion of a first layer of the raft, the exterior portion of the first layer of the raft having a first adhesion force with the build platform, the first adhesion force measured per unit area of the exterior portion on the build platform;

fabricating the interior portion of the first layer of the raft, the interior portion of the first layer of the raft having a second adhesion force with the build platform, the second adhesion force measured per unit area of the interior portion on the build platform, the second adhesion force less than the first adhesion force; and fabricating the three-dimensional object on the raft.

2. The method of claim 1, wherein fabricating the exterior portion of the first layer of the raft includes depositing build material at a first volumetric rate per unit of length and fabricating the interior portion of the first layer of the raft includes depositing build material at a second volumetric rate per unit of length, the first volumetric rate greater than the second volumetric rate.

3. The method of claim 1, wherein fabricating the exterior portion of the first layer of the raft includes depositing build material at a first z-axis height above the build platform and fabricating the interior portion of the first layer of the raft includes depositing build material at a second z-axis height above the build platform, the second z-axis height greater than the first z-axis height.

4. The method of claim 1, wherein fabricating the exterior portion of the first layer of the raft includes depositing build material using a first build pattern and fabricating the interior portion of the first layer of the raft includes depositing build material using a second build pattern different from the first build pattern.

5. The method of claim 4, wherein the first build pattern and the second build pattern each include segments of build material, the segments of build material of the first pattern spaced closer together on average than the segments of build material of the second build pattern.

6. The method of claim 4, wherein the second build pattern includes elongate strips of build material deposited in substantially straight lines.

7. The method of claim 6, wherein the elongate strips of build material are in one or more groups, each group in the one or more groups including a plurality of the elongate strips directly adjacent to one another.

8. The method of claim 7, wherein the elongate strips are directly adjacent to one another along a respective longitudinal dimension of each elongate strip.

9. The method of claim 8, wherein the one or more groups form a lever pivotable about an axis transverse to the respective longitudinal dimension of each elongate strip to remove the raft from the build platform.

10. The method of claim 4, wherein the second build pattern substantially uniformly diffuses heat of deposited build material.

11. The method of claim 1, wherein a magnitude of first adhesion force relative to the second adhesion force is a function of a size of the exterior portion relative to the interior portion.

12. The method of claim 11, wherein the size of the exterior portion is about 30% greater than a size of the interior portion.

13. The method of claim 11, wherein the size of the exterior portion is about 50% greater than a size of the interior portion.

14. The method of claim 1, further comprising fabricating a second layer of the raft above the build platform, wherein at least one portion of the second layer of the raft is deposited at a z-axis height within build material of the first layer of the raft.

15. The method of claim 1, further comprising
fabricating a platform above the first layer of the raft, the platform supporting the three-dimensional object; and
fabricating a projection extending from the platform, the projection engageable to impart force on the raft as the raft is removed from the build platform.

16. The method of claim 15, wherein the projection is disposed on a top portion of the platform of the raft.

17. The method of claim 16, wherein the projection includes an elongate bar along the top portion of the raft.

18. The method of claim 16, wherein the projection includes a tab disposed on one or more of an outer edge of the platform of the raft and a top portion of the platform of the raft.

19. The method of claim 18, wherein the tab defines an aperture.

20. A computer program product comprising non-transitory computer-executable code embodied in a non-transitory computer readable medium that, when executing on one or more computing devices, performs the steps of:
generating tool instructions for fabricating a raft to support a three-dimensional object on a build platform of a three-dimensional printer, the raft including an exterior portion and an interior portion, the exterior portion near a border of the raft outside of a perimeter of a base layer of the three-dimensional object to be fabricated on the raft, and the interior portion contained within the exterior portion, the tool instructions providing for an extruder of the three-dimensional printer to perform the steps of:
fabricating the exterior portion of a first layer of the raft, the exterior portion having a first adhesion force with the build platform, the first adhesion force measured per unit area of the exterior portion on the build platform;
fabricating the interior portion of the first layer of the raft, the interior portion having a second adhesion force with the build platform, the second adhesion force measured per unit area of the interior portion on the build platform, the second adhesion force less than the first adhesion force; and
fabricating the three-dimensional object on the raft.

* * * * *